US006831717B2

(12) United States Patent
Hanakawa et al.

(10) Patent No.: US 6,831,717 B2
(45) Date of Patent: Dec. 14, 2004

(54) LIQUID CRYSTAL DEVICE, METHOD FOR MAKING THE SAME, AND ELECTRONIC APPARATUS

(75) Inventors: Manabu Hanakawa, Nagano-ken (JP); Shoji Hinata, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/795,745

(22) Filed: Mar. 8, 2004

(65) Prior Publication Data

US 2004/0169799 A1 Sep. 2, 2004

Related U.S. Application Data

(62) Division of application No. 09/865,197, filed on May 24, 2001.

(30) Foreign Application Priority Data

| May 25, 2000 | (JP) | ......................................... 2000-154697 |
| May 25, 2000 | (JP) | ......................................... 2000-154699 |
| Apr. 2, 2001 | (JP) | ......................................... 2001-103496 |

(51) Int. Cl.[7] .......................................... G02F 1/1335
(52) U.S. Cl. ....................................................... 349/113
(58) Field of Search ........................................... 349/113

(56) References Cited

U.S. PATENT DOCUMENTS

| 6,008,871 | A | 12/1999 | Okumura |
| 6,081,310 | A | 6/2000 | Katsuya |
| 6,144,429 | A | 11/2000 | Nakai |
| 6,147,728 | A | 11/2000 | Okumura |
| 6,172,726 | B1 | 1/2001 | Matsute |
| 6,264,336 | B1 | 7/2001 | Epstein |
| 6,292,238 | B1 * | 9/2001 | Okada et al. .................. 349/58 |
| 6,366,331 | B1 | 4/2002 | Sakamoto |
| 6,426,787 | B1 | 7/2002 | Satake |
| 6,456,344 | B1 | 9/2002 | Nemoto |
| 6,483,562 | B1 | 11/2002 | Fukuyoshi |
| 6,509,942 | B2 | 1/2003 | Tanaka |
| 2001/0026120 | A1 | 10/2001 | Fukuyoshi |
| 2002/0005928 | A1 | 1/2002 | Hanakawa |

FOREIGN PATENT DOCUMENTS

| EP | 0 733 931 A2 | 9/1996 |
| EP | 0 733 931 A3 | 8/1997 |
| JP | 04-037146 | 2/1992 |
| JP | 05-281531 | 10/1993 |
| JP | 06-175121 | 6/1994 |
| JP | 06-222372 | 8/1994 |

(List continued on next page.)

OTHER PUBLICATIONS

Patent Abstracts of Japan for JP 2000–180848.
Patent Abstracts of Japan for JP 2000–019507.
Patent Abstracts of Japan for JP 11–224647.
Patent Abstracts of Japan for JP 08–262207.
Patent Abstracts of Japan for JP 08–146219.

*Primary Examiner*—Tarifur R. Chowdhury
*Assistant Examiner*—Jeanne Andrea Di Grazio
(74) *Attorney, Agent, or Firm*—Harness, Dickey & Pierce, P.L.C.

(57) ABSTRACT

A liquid crystal device has a configuration including substrates 200 and 300 bonded to each other with a sealant 110 and a liquid crystal 160 enclosed in the gap therebetween. Common electrodes 214 are provided on the inner face of the substrate 200, whereas an underlying film 301, a reflective film 302 composed of a silver alloy, a protective film 303 covering the reflective film 302, and segment electrodes 314 are provided on the inner face of the backside substrate 300. Since the protective film 303 suppresses the crystal grain growth of the reflective film 302 at a high-temperature treatment, a decrease in reflectance is avoided. A lead 350 comprises a laminate of a reflective conductive film 352 having a crystal grain size which is larger than that of the reflective film 302 and a transparent conductive film 354 which is formed by patterning the same layer as the segment electrode 314.

6 Claims, 31 Drawing Sheets

FOREIGN PATENT DOCUMENTS

| | | |
|---|---|---|
| JP | 07-134300 | 5/1995 |
| JP | 07-181483 | 7/1995 |
| JP | 07-218923 | 8/1995 |
| JP | 09-152623 | 6/1997 |
| JP | 09-171717 | 6/1997 |
| JP | 09-230806 | 9/1997 |
| JP | 09-236811 | 9/1997 |
| JP | 09-281516 | 10/1997 |
| JP | 09-283866 | 10/1997 |
| JP | 10-239697 | 9/1998 |
| JP | 10-333177 | 12/1998 |
| JP | 11-002707 | 1/1999 |
| JP | 11-265000 | 9/1999 |
| JP | 11-282383 | 10/1999 |
| JP | 11-337924 | 12/1999 |
| JP | 11-337974 | 12/1999 |
| JP | 2000-021885 | 1/2000 |
| JP | 2000-047200 | 2/2000 |
| JP | 2001-083502 | 3/2001 |

* cited by examiner

[Fig. 1]
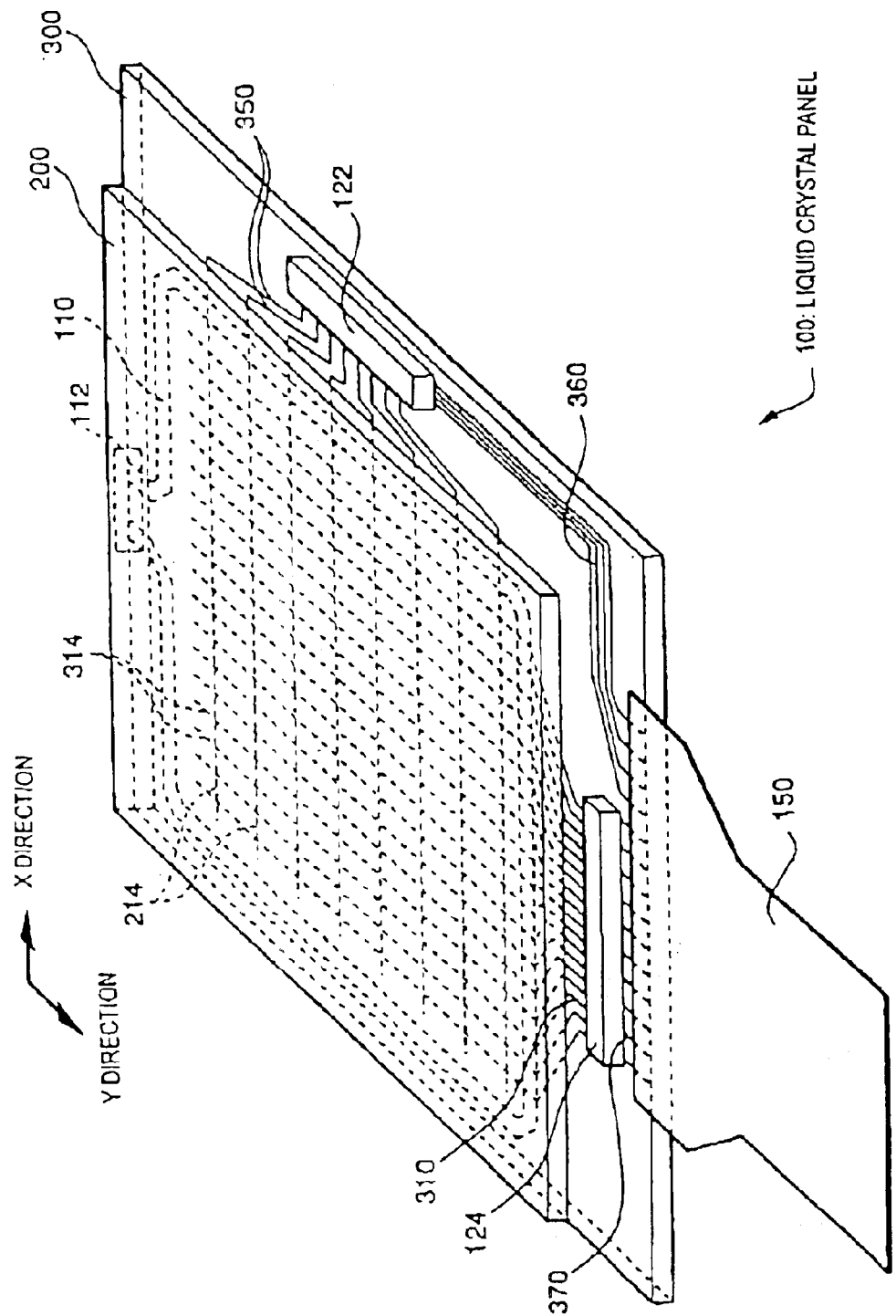

[Fig. 2]
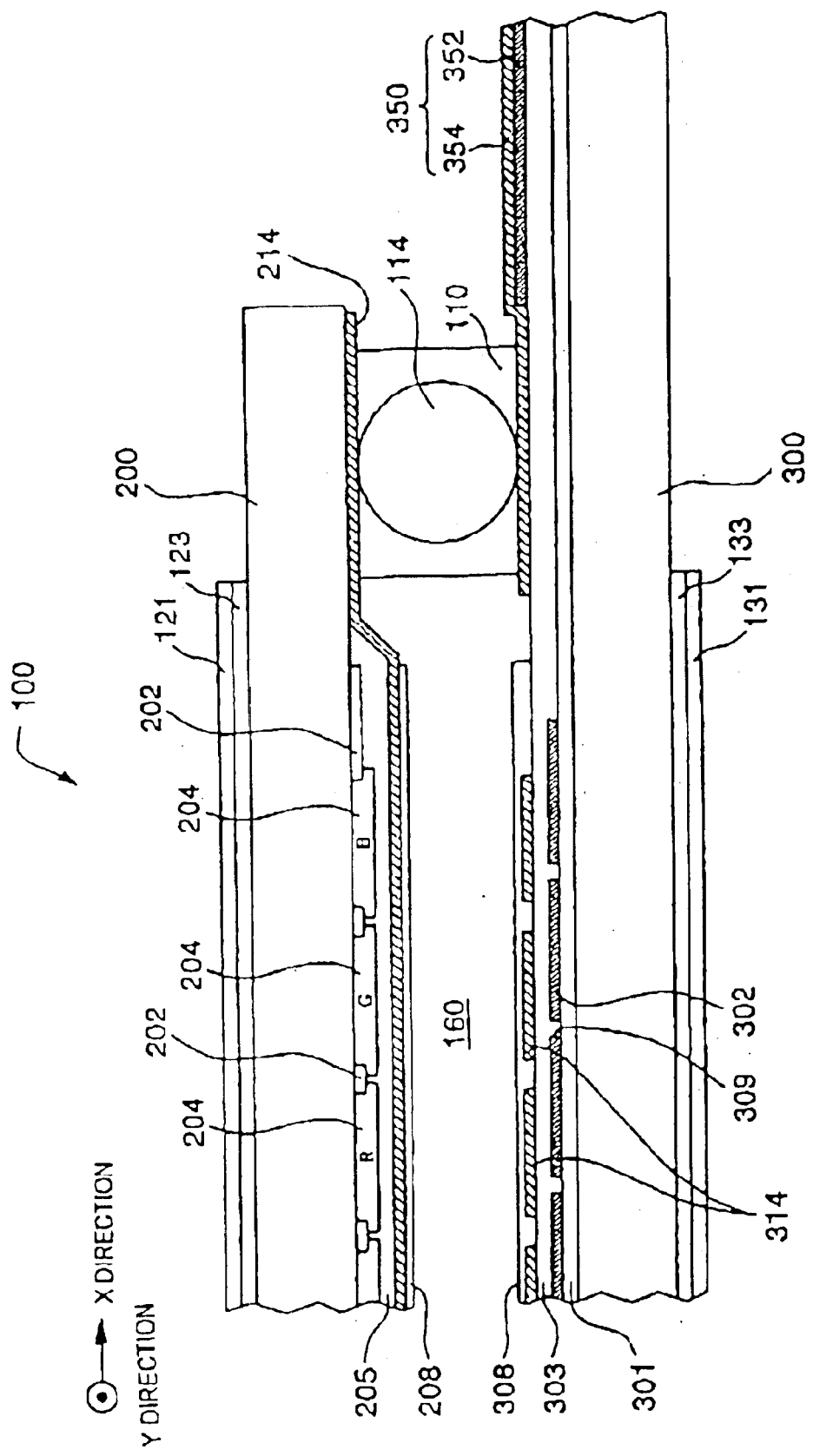

[Fig. 3]
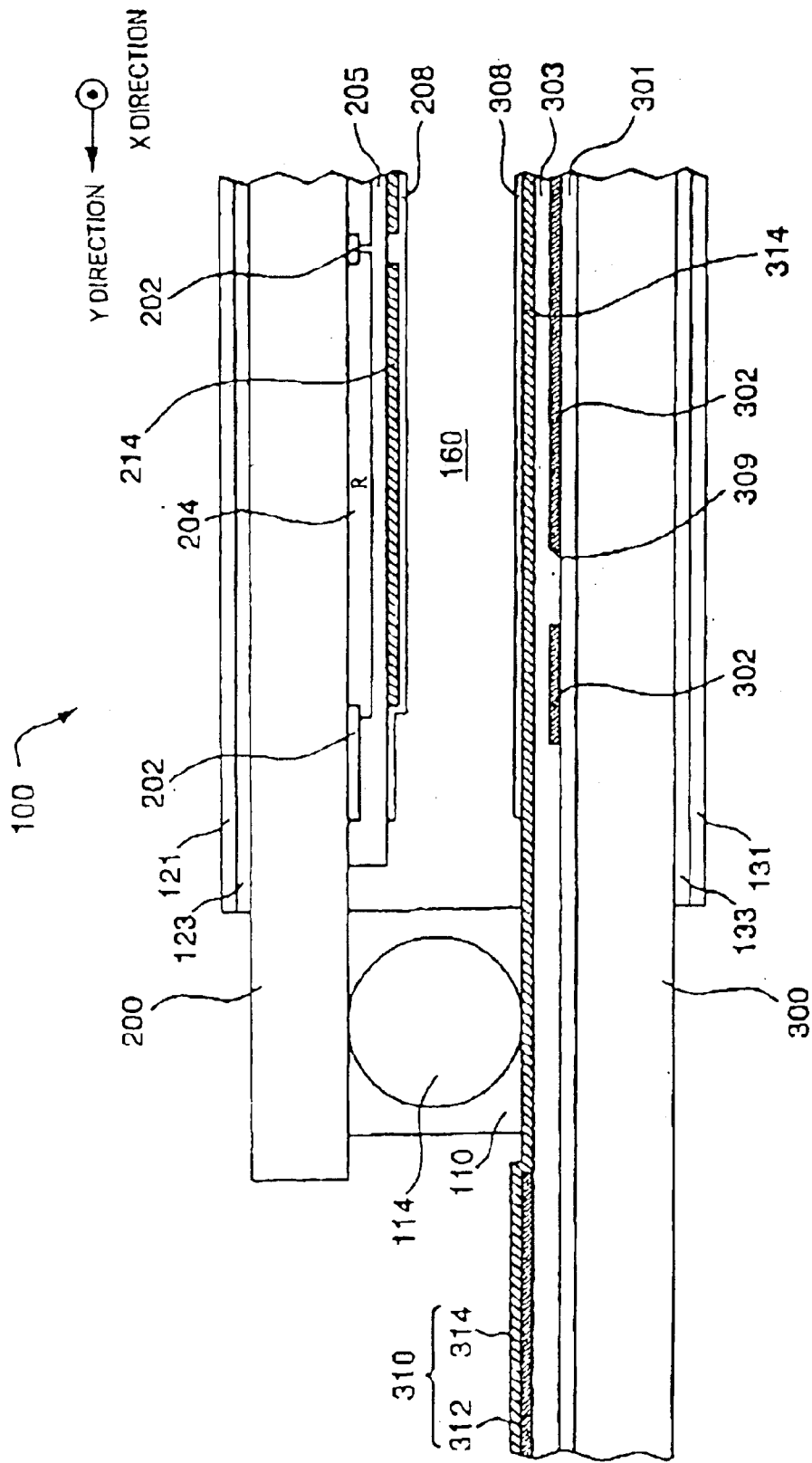

[Fig. 4]
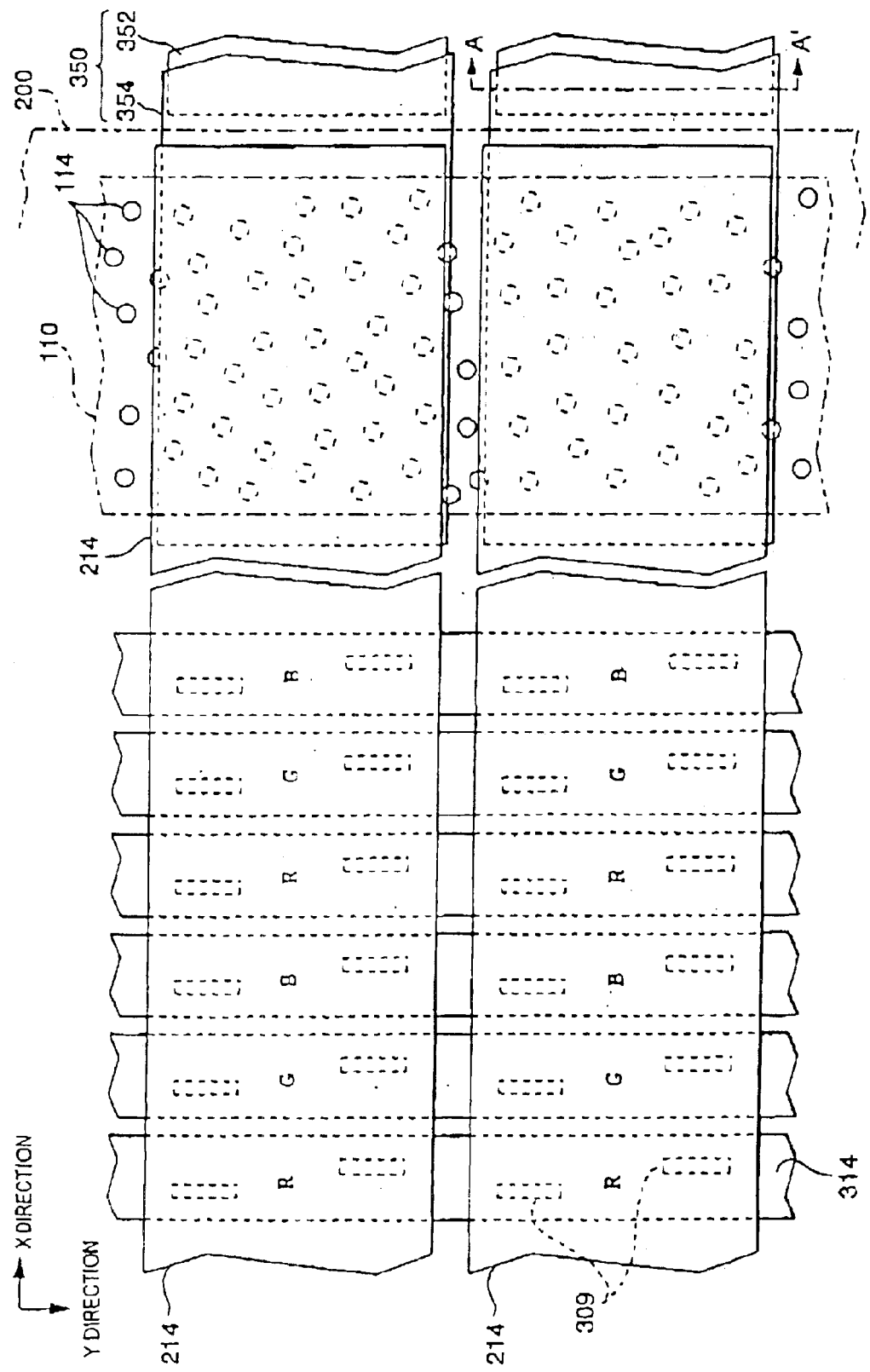

[Fig. 5]
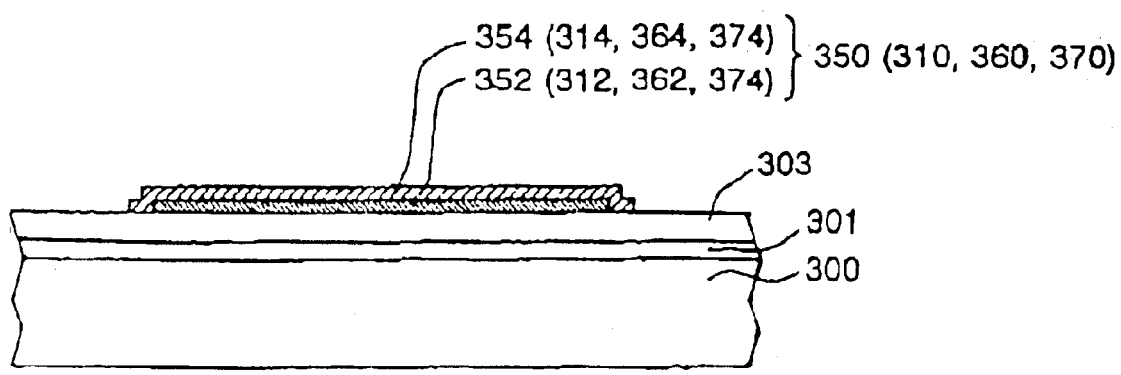

[Fig. 6]
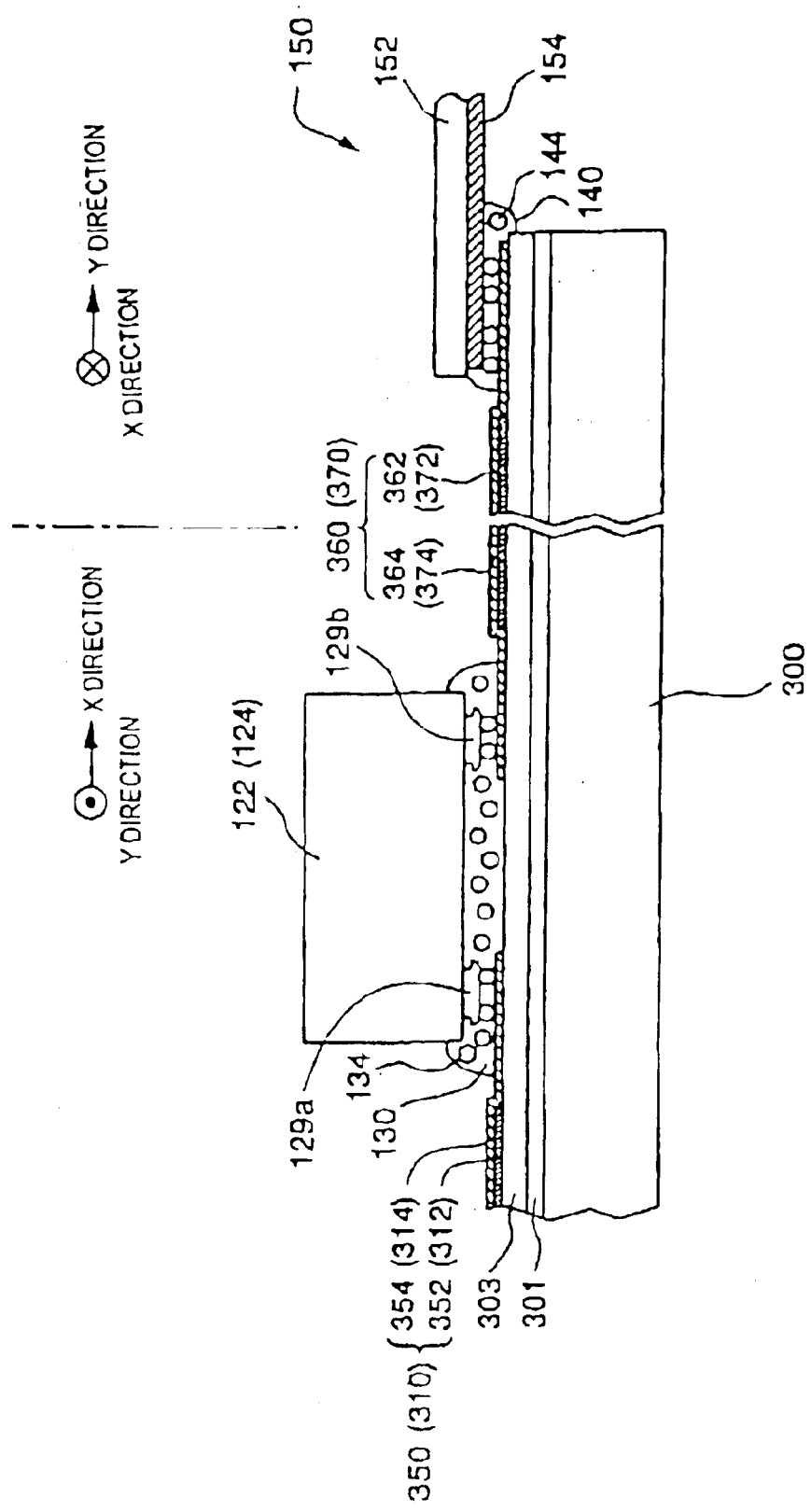

[Fig. 7]
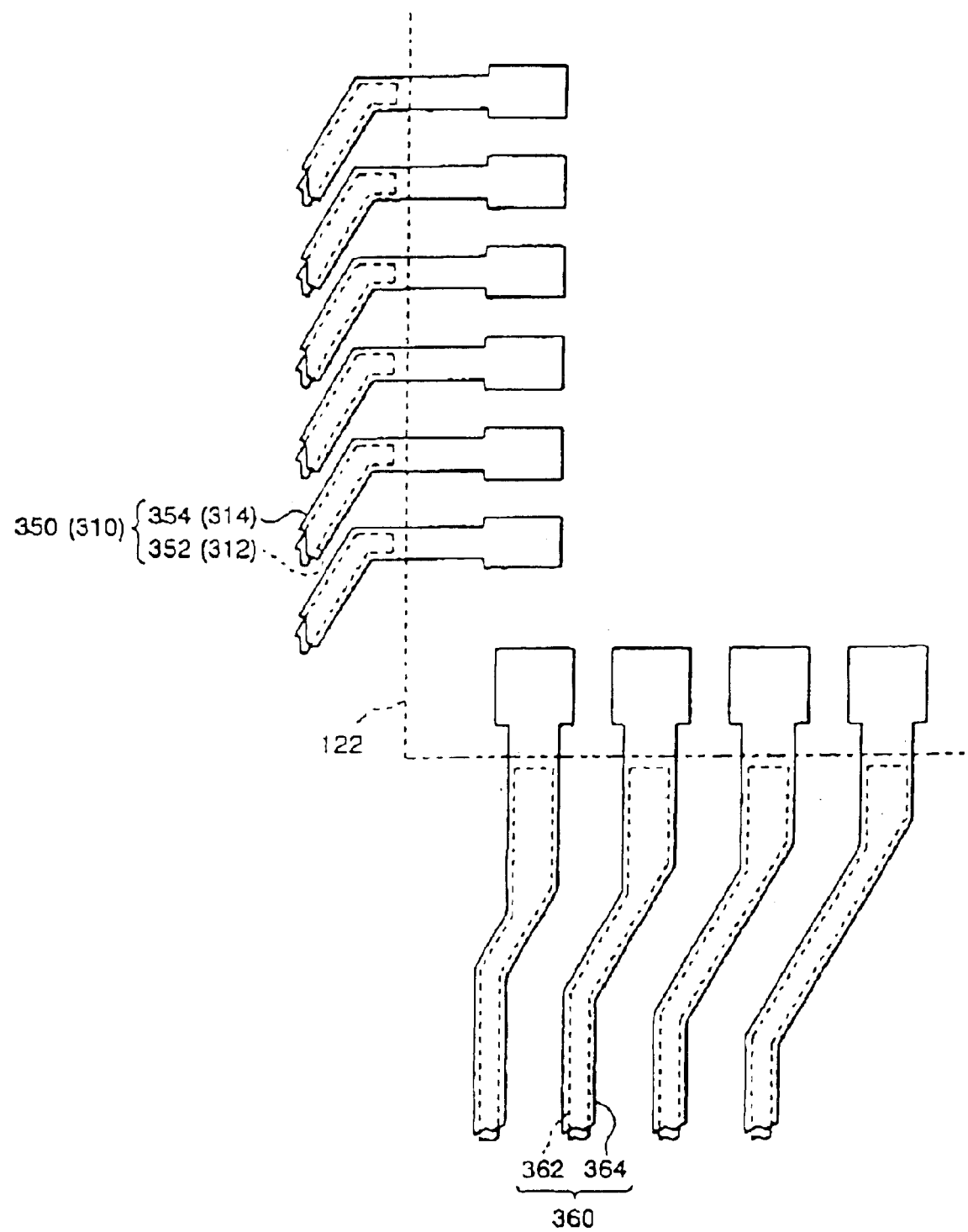

[Fig. 8]
(a)
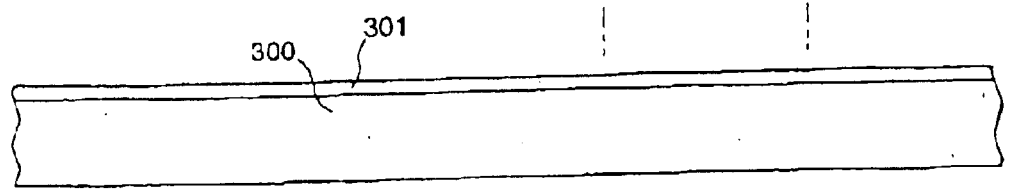
(b) LOW TEMPERATURE SPUTTERING
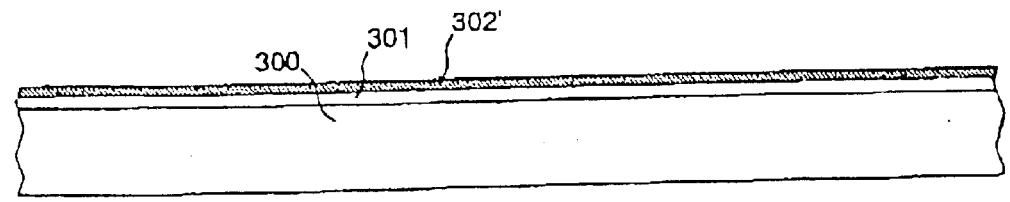
(c)
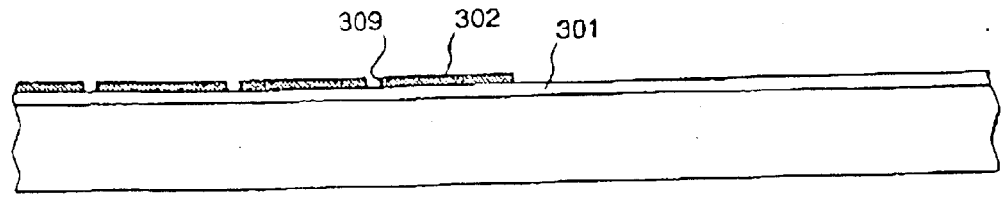
(d)
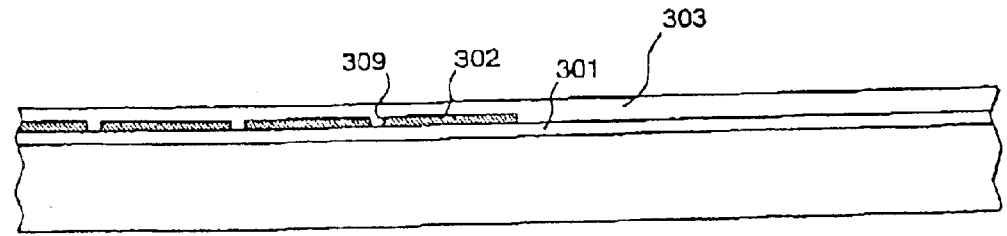
(e) HIGH TEMPERATURE SPUTTERING
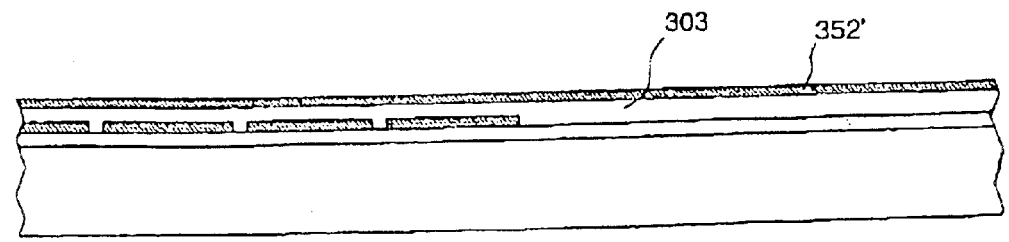

[Fig. 9]
(f)
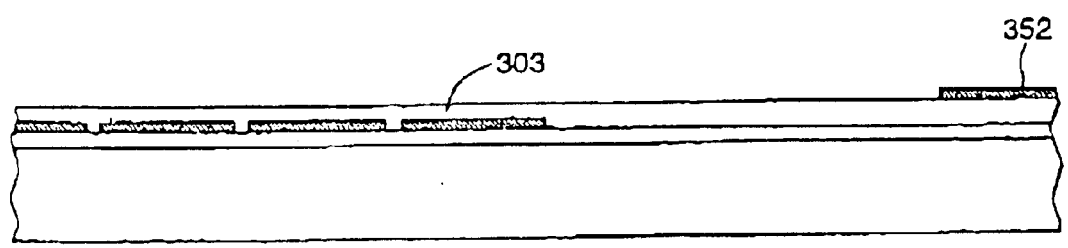
(g)
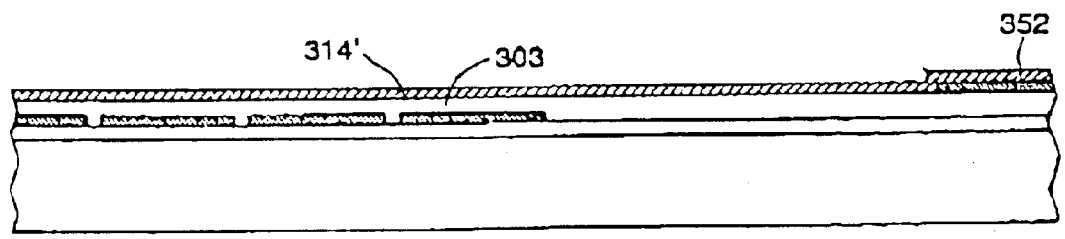
(h)
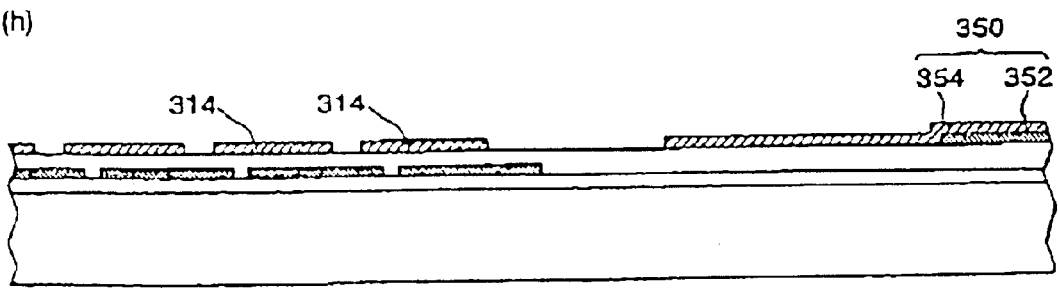
(i)
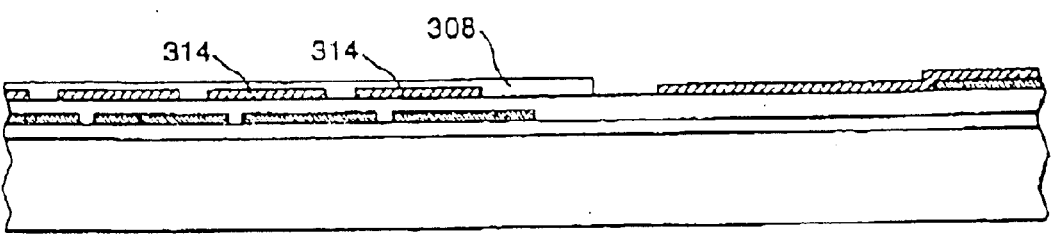

[Fig. 10]
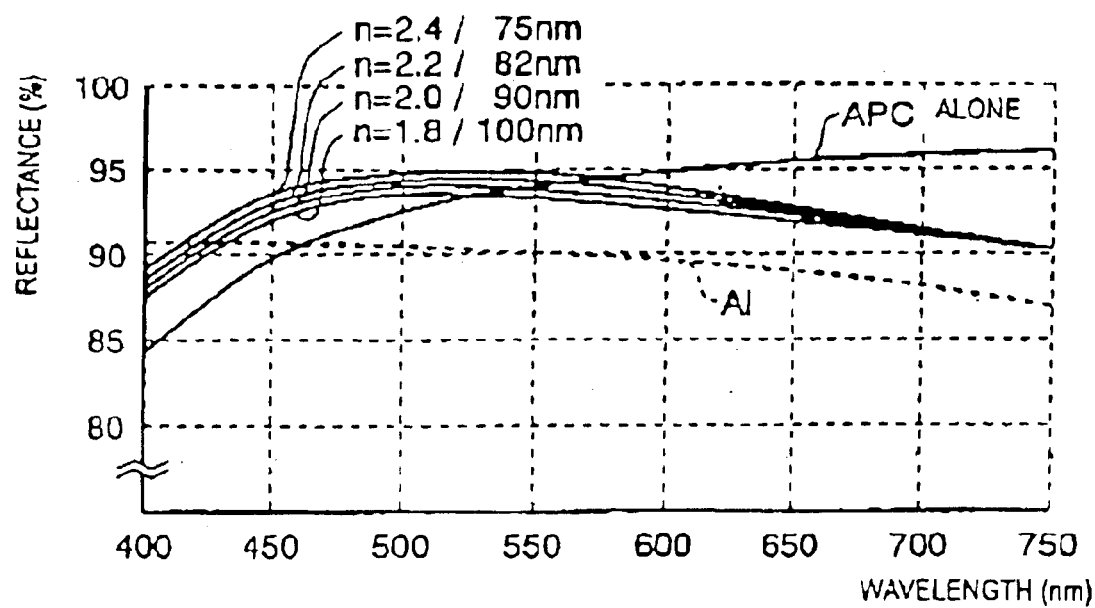

[Fig. 11]
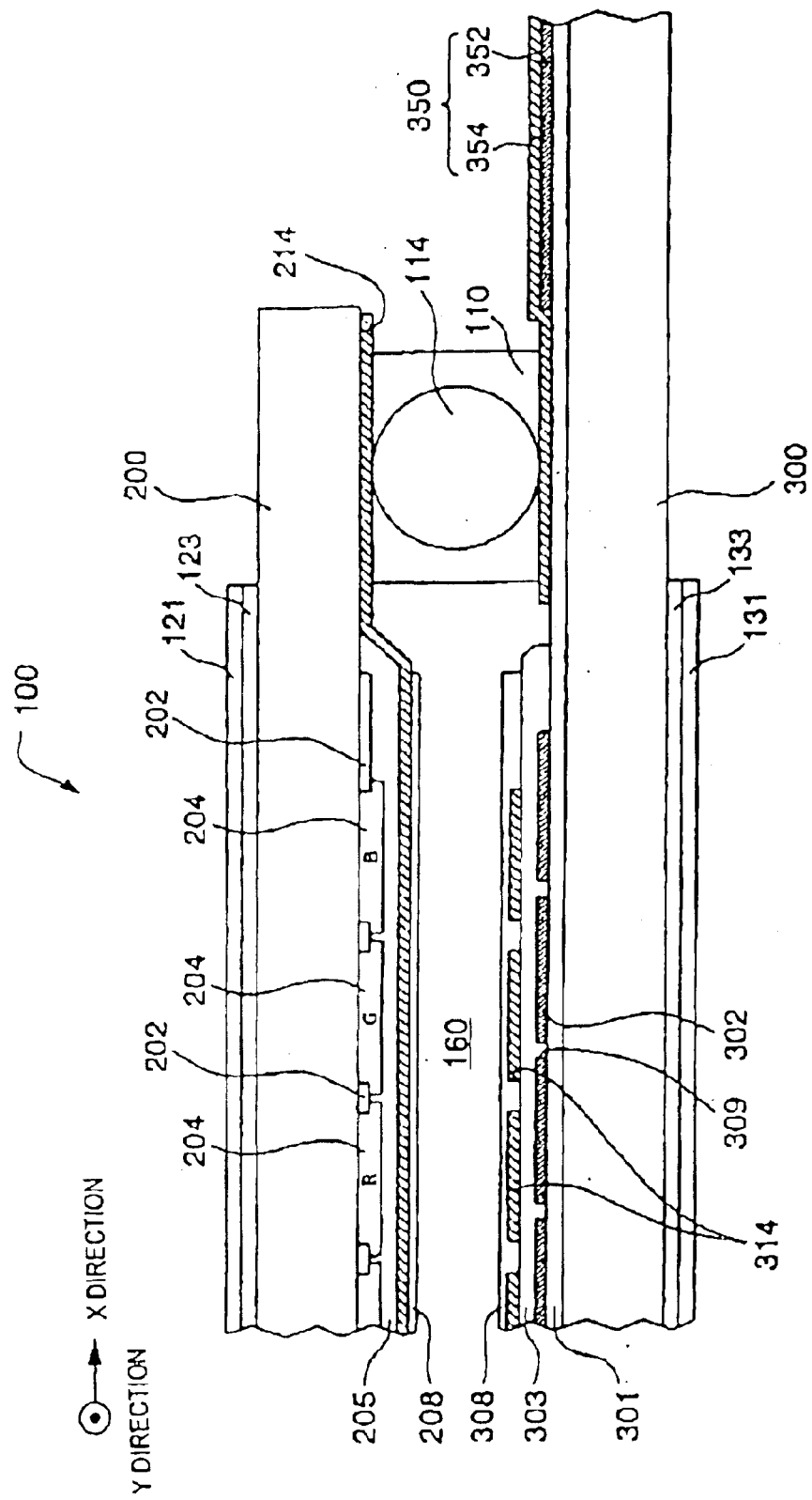

[Fig. 12]
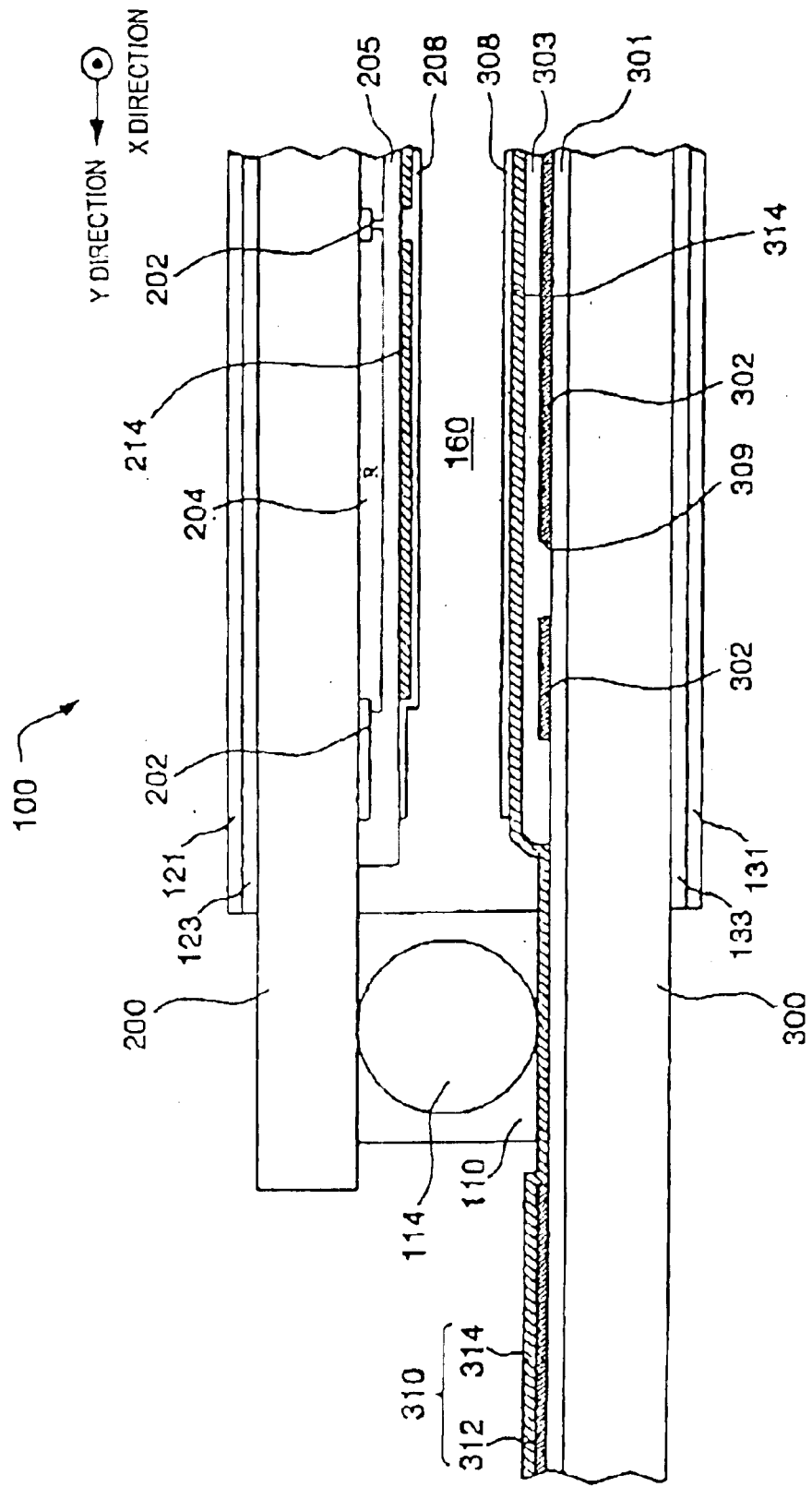

[Fig. 13]
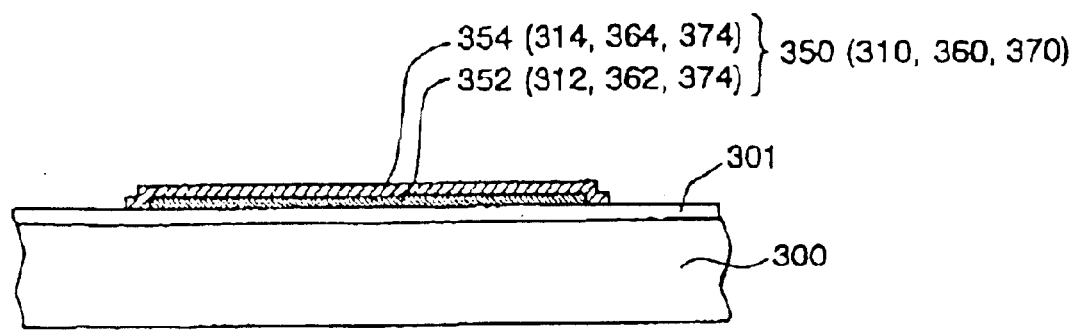

[Fig. 14]
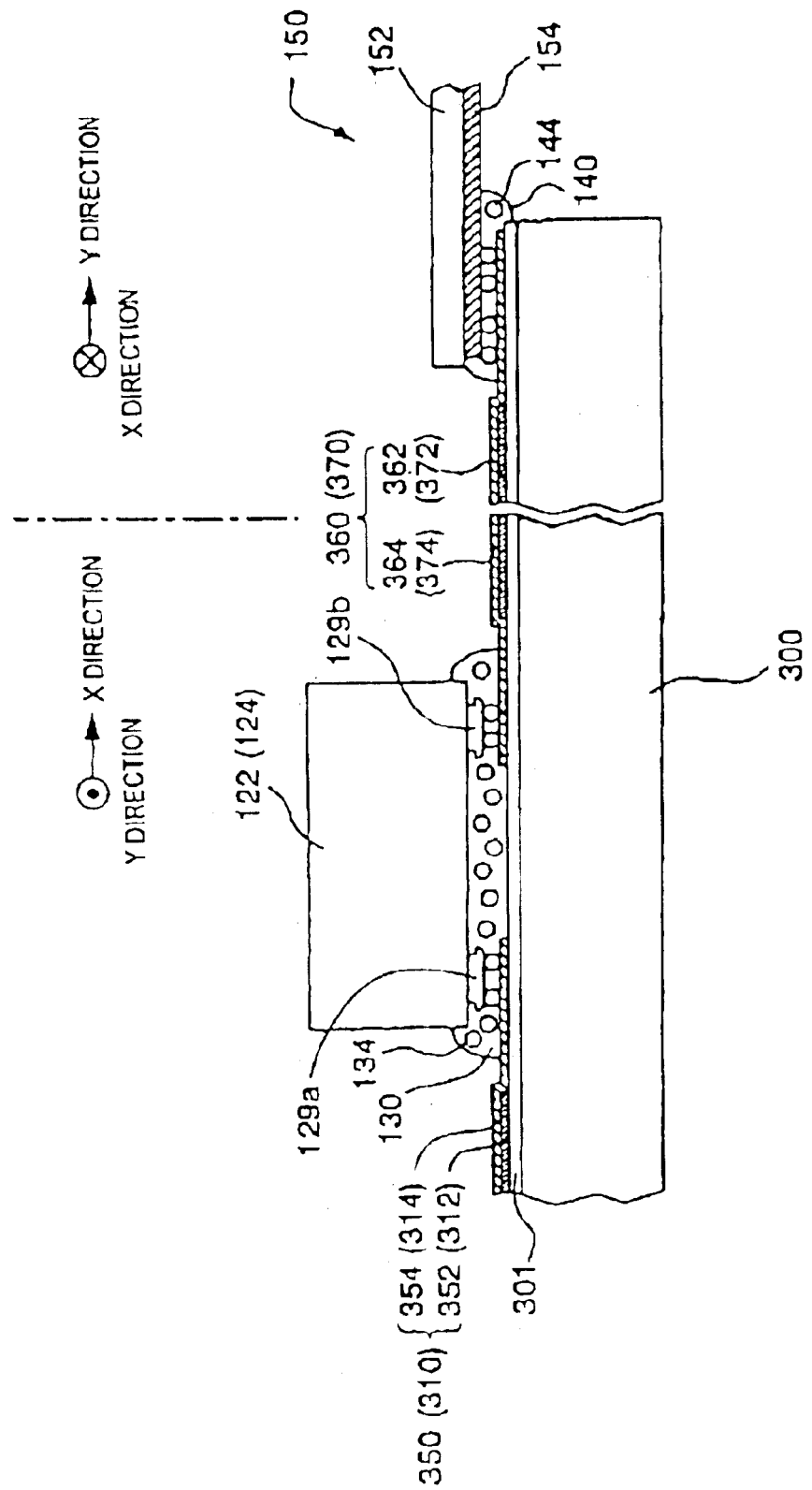

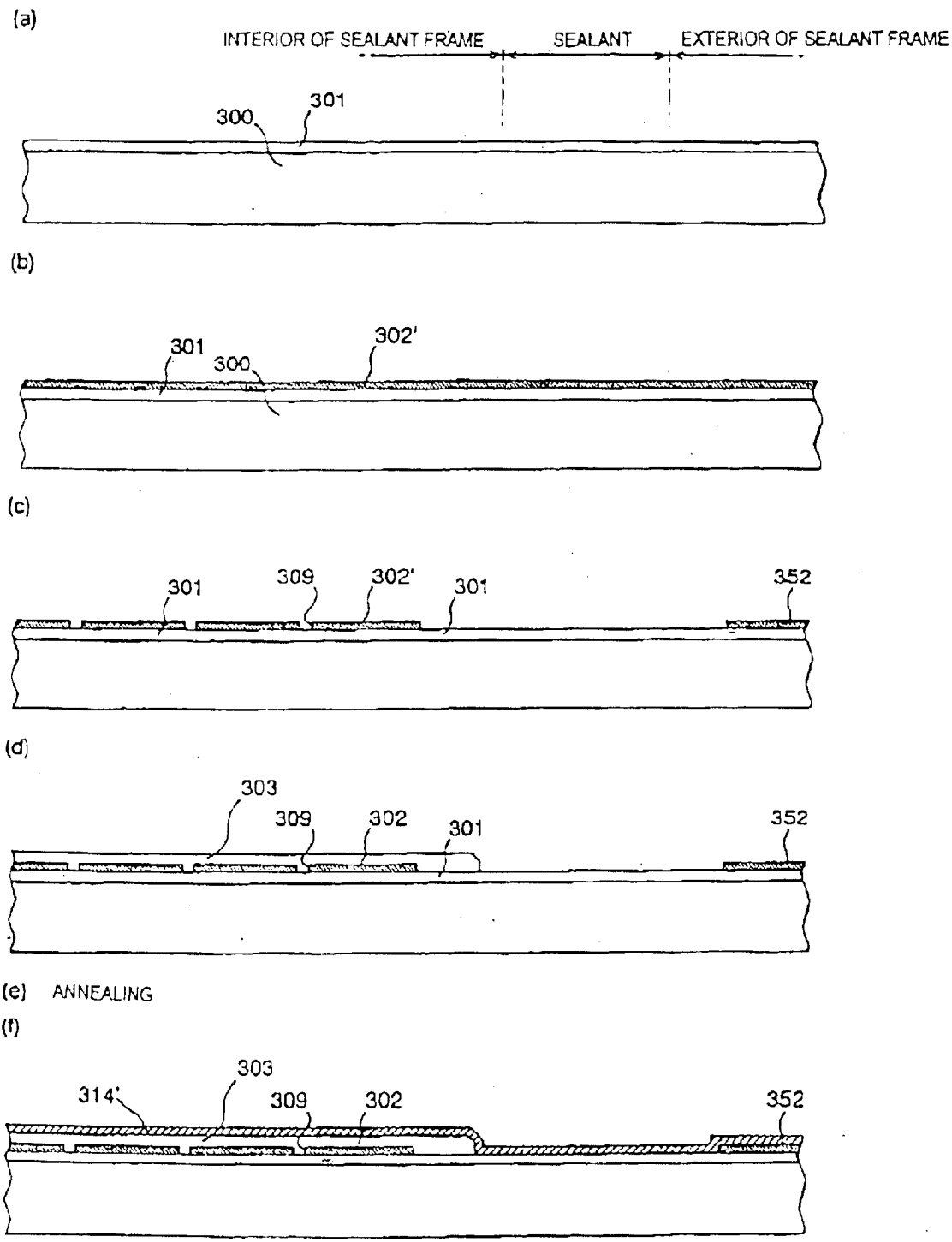
[Fig. 15]

[Fig. 16]
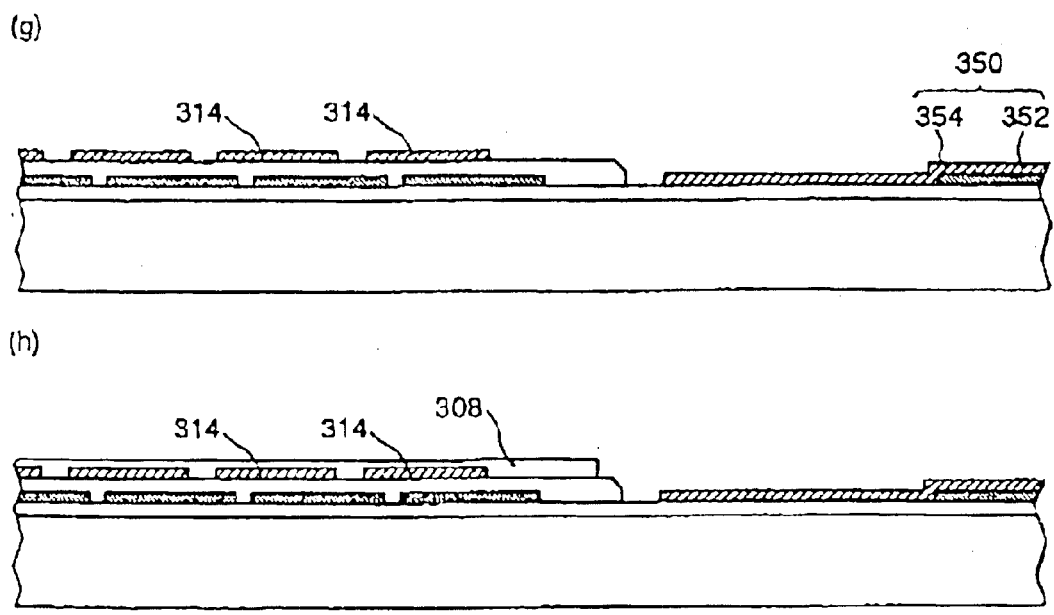

[Fig. 17]
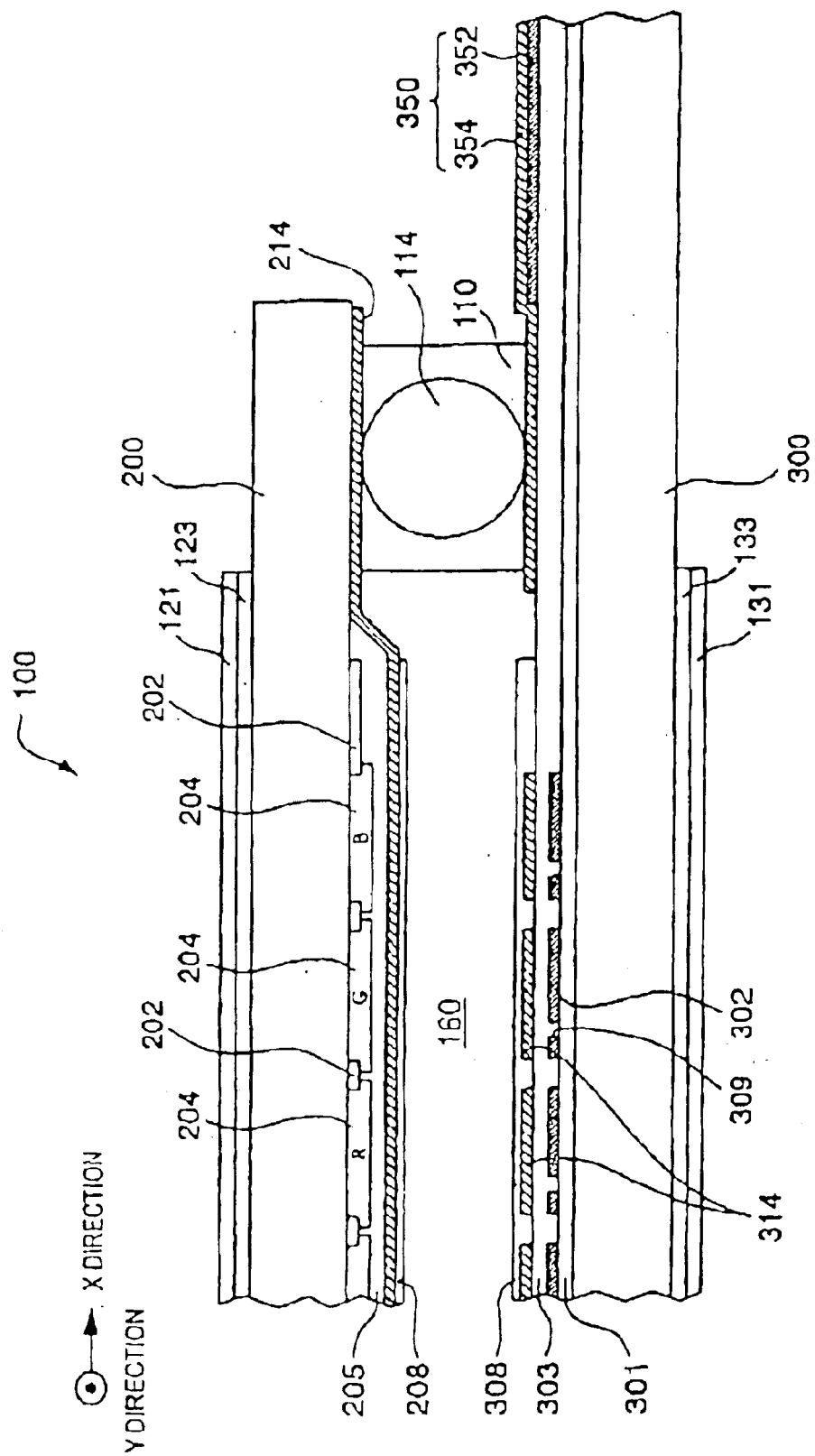

[Fig. 18]
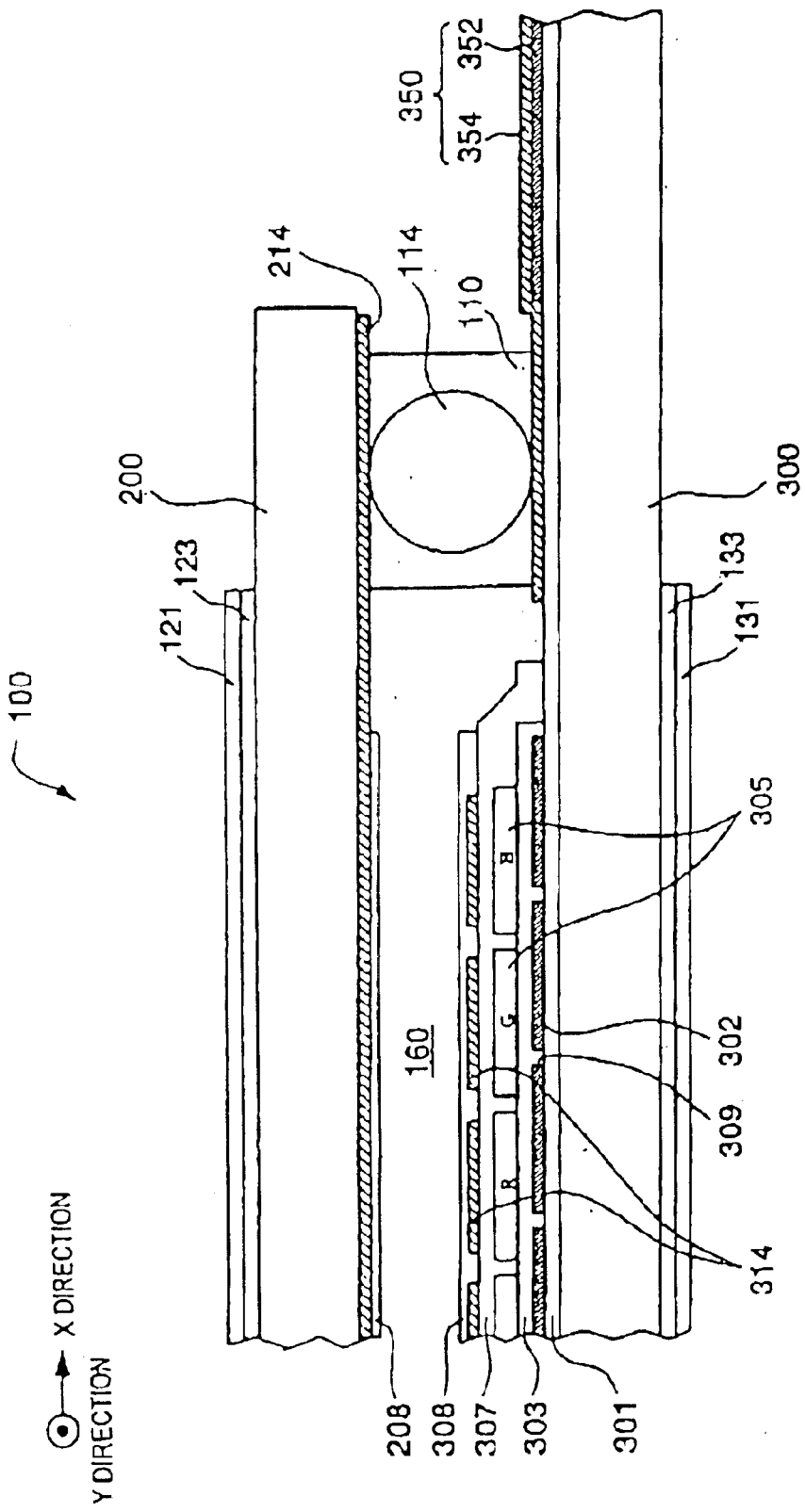

[Fig. 19]
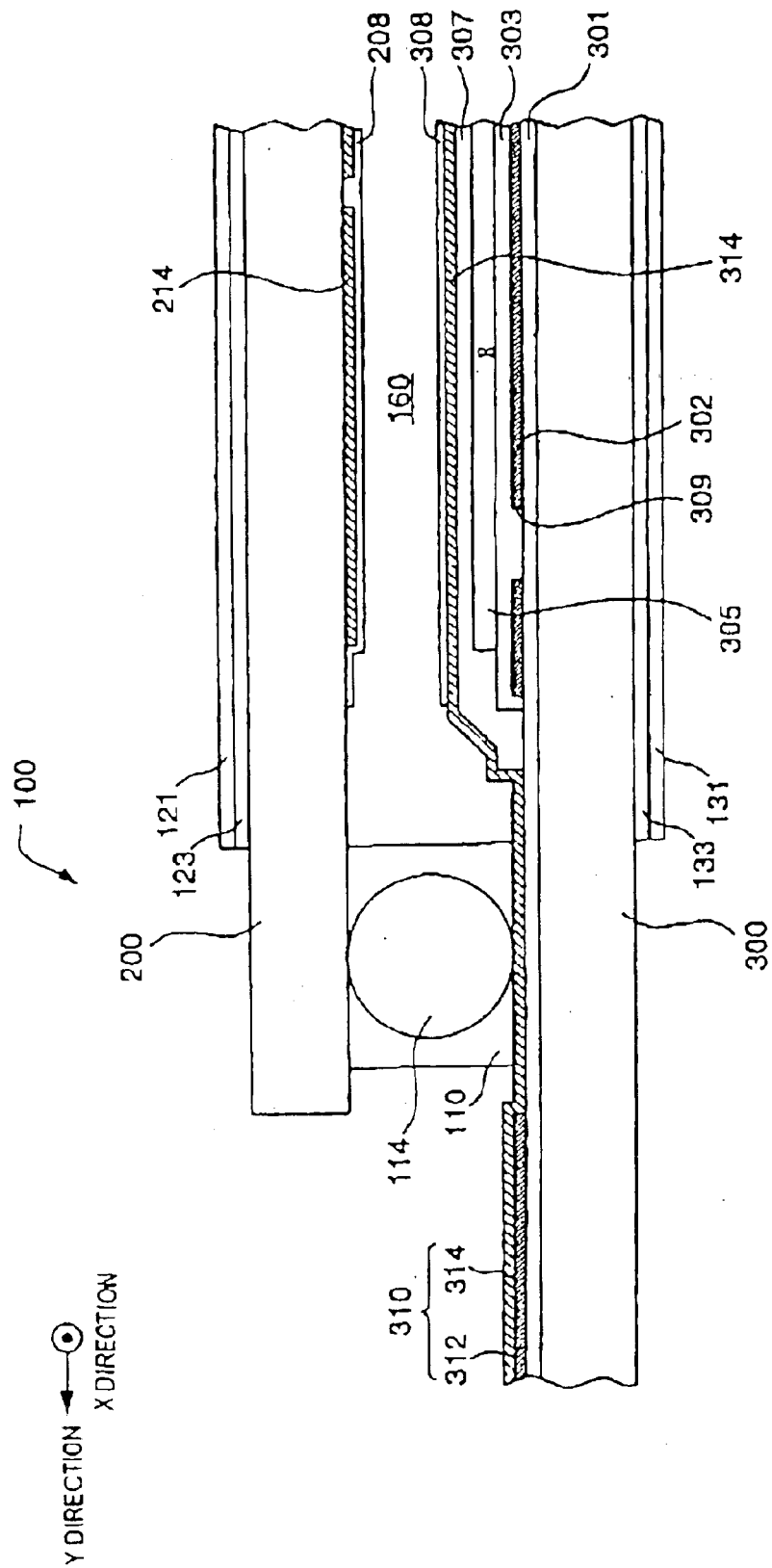

[Fig. 20]
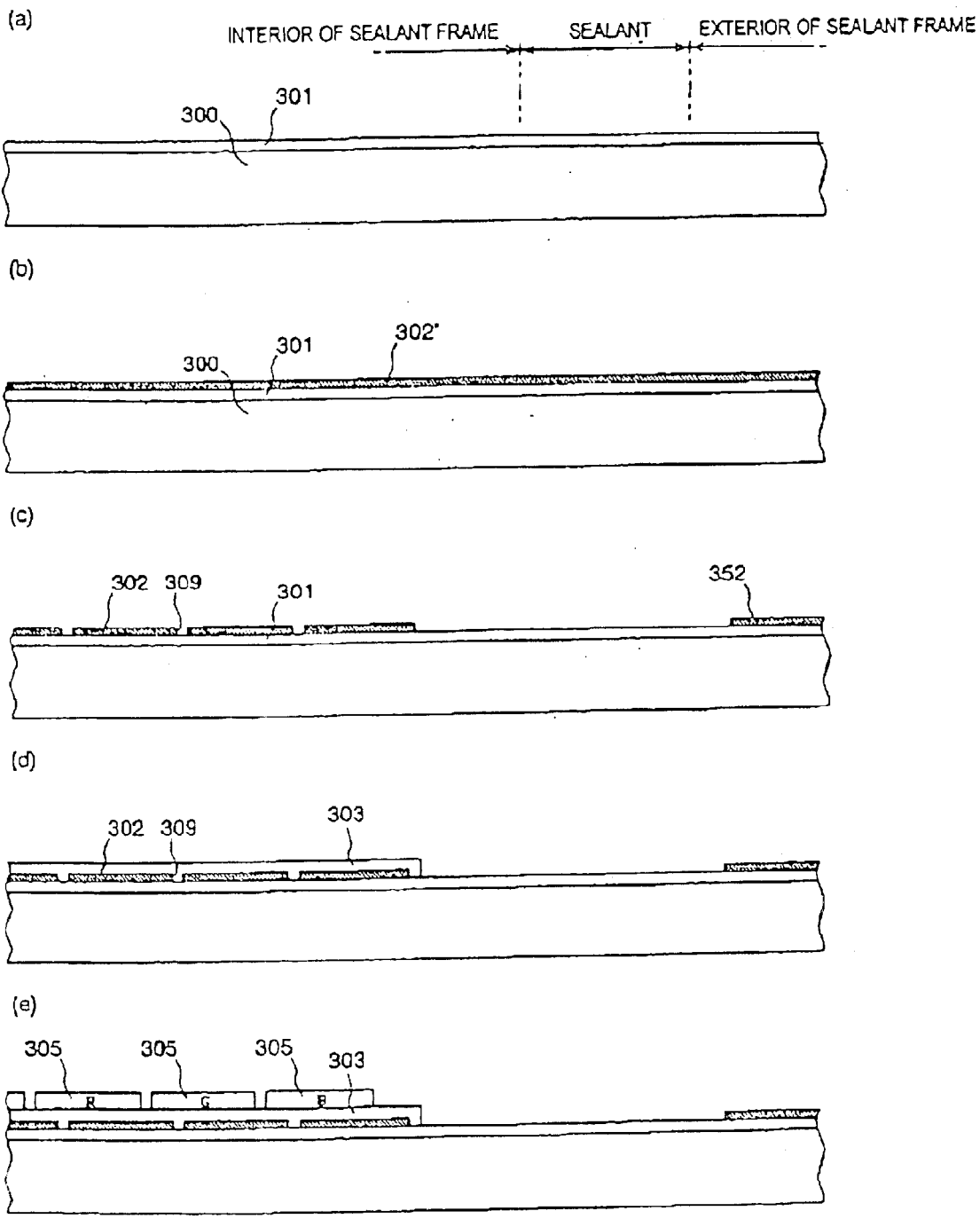

[Fig. 21]
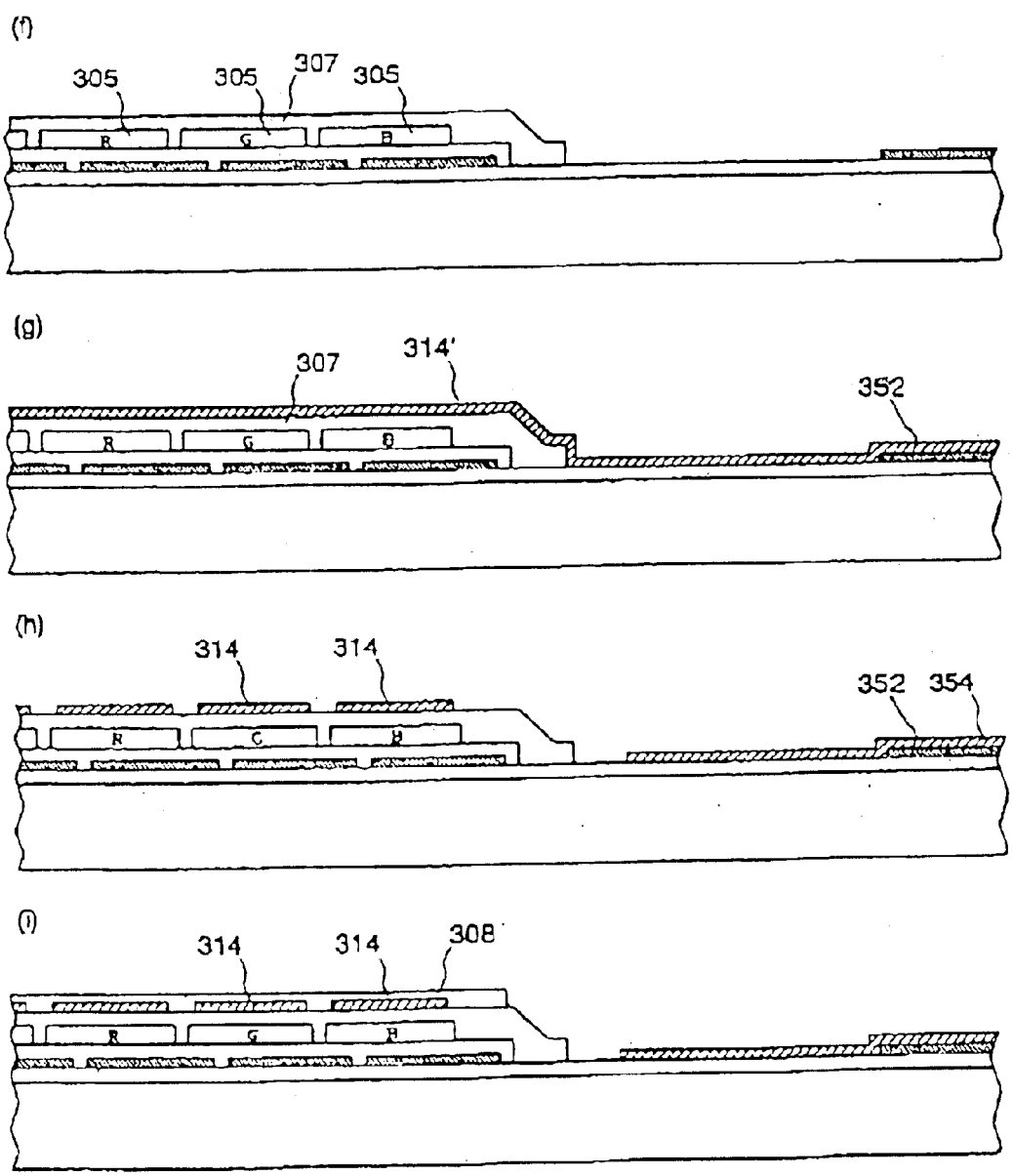

[Fig. 22]
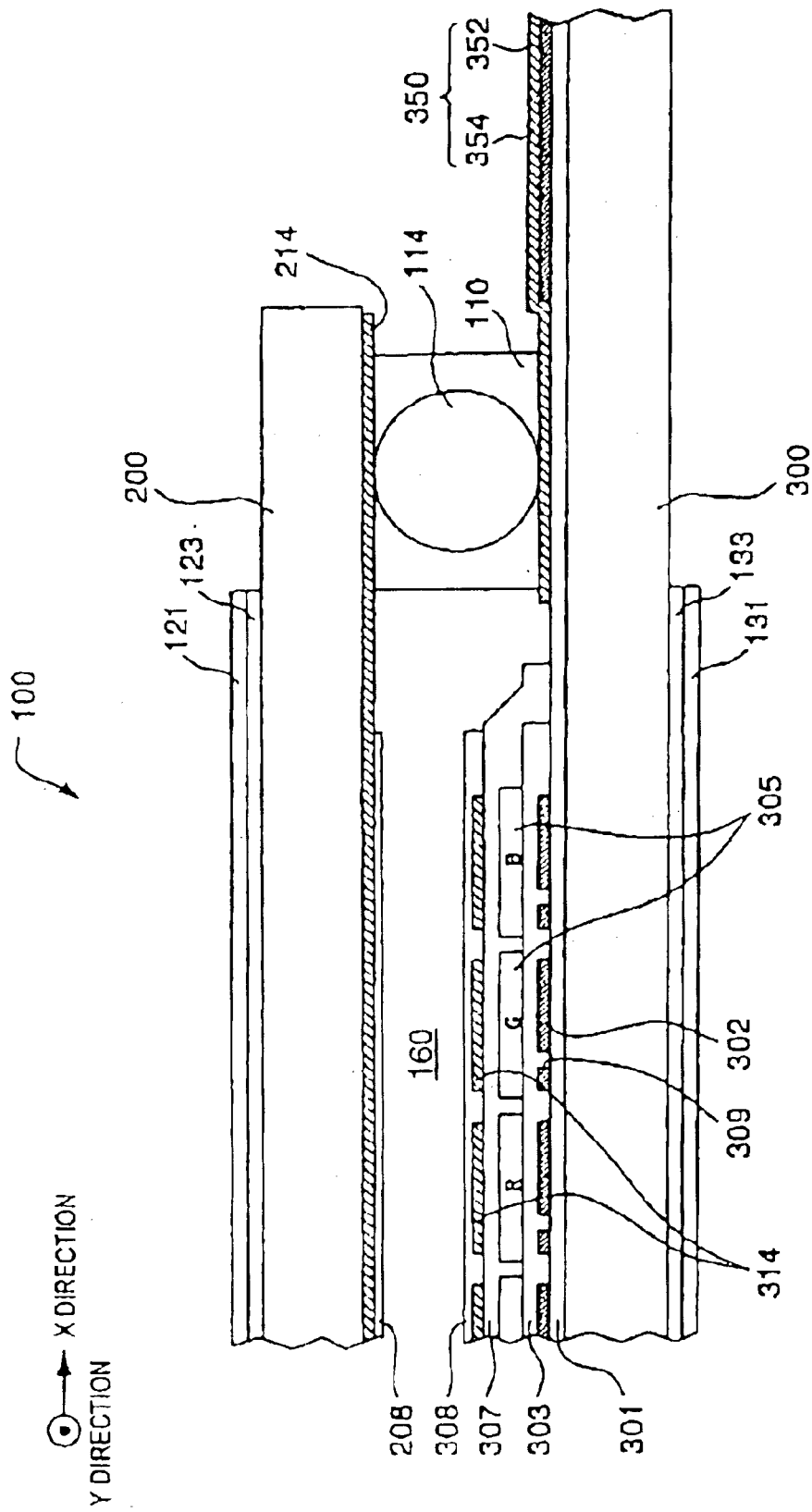

[Fig. 23]
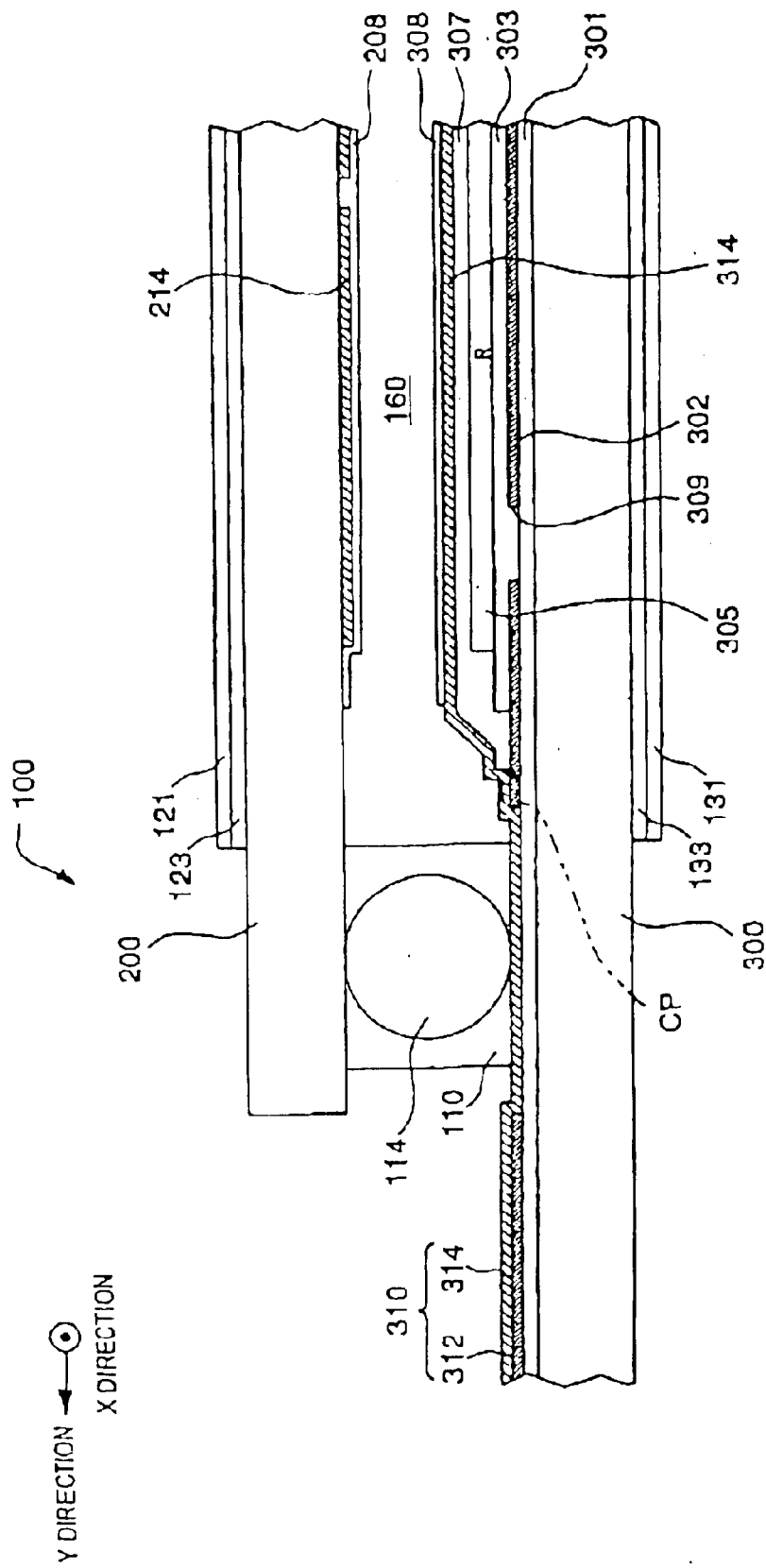

[Fig. 24]
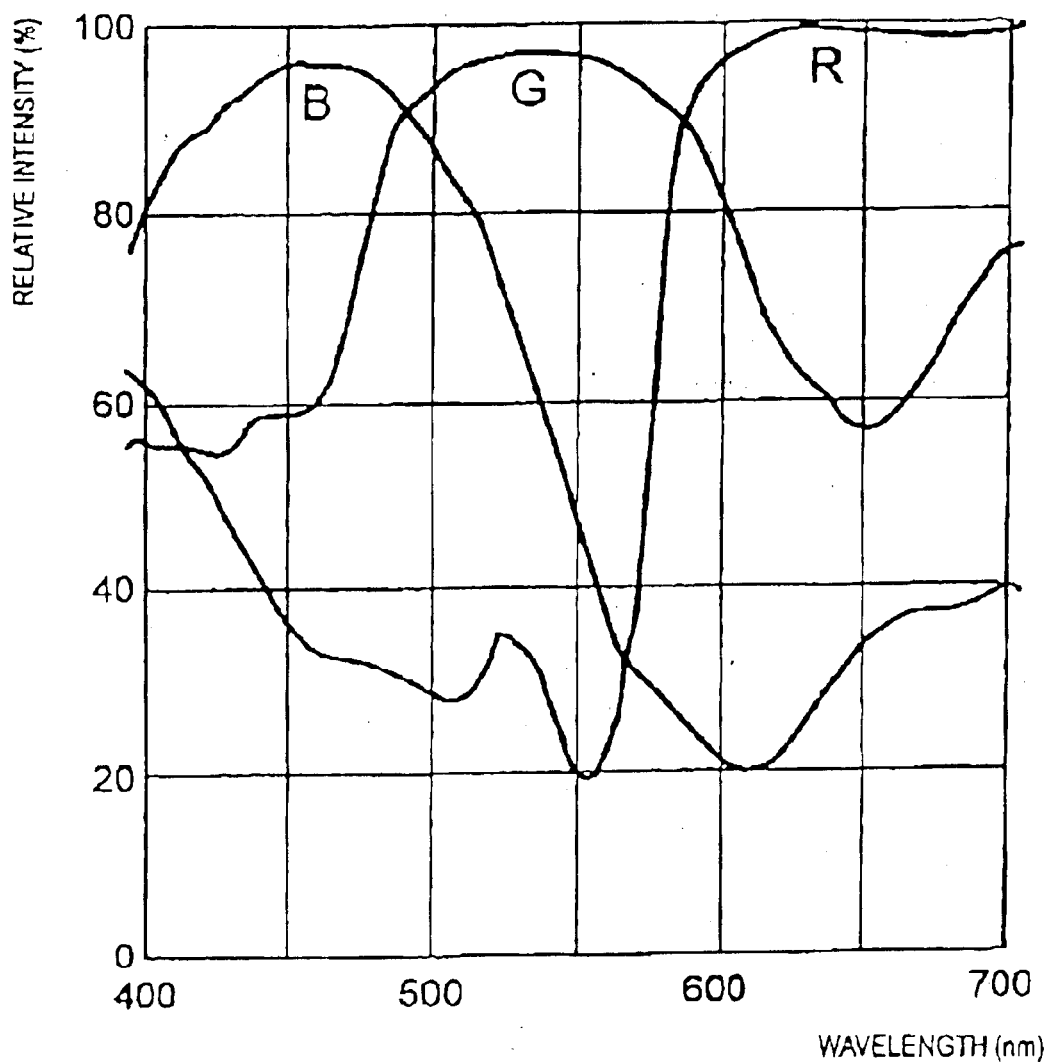

[Fig. 25]
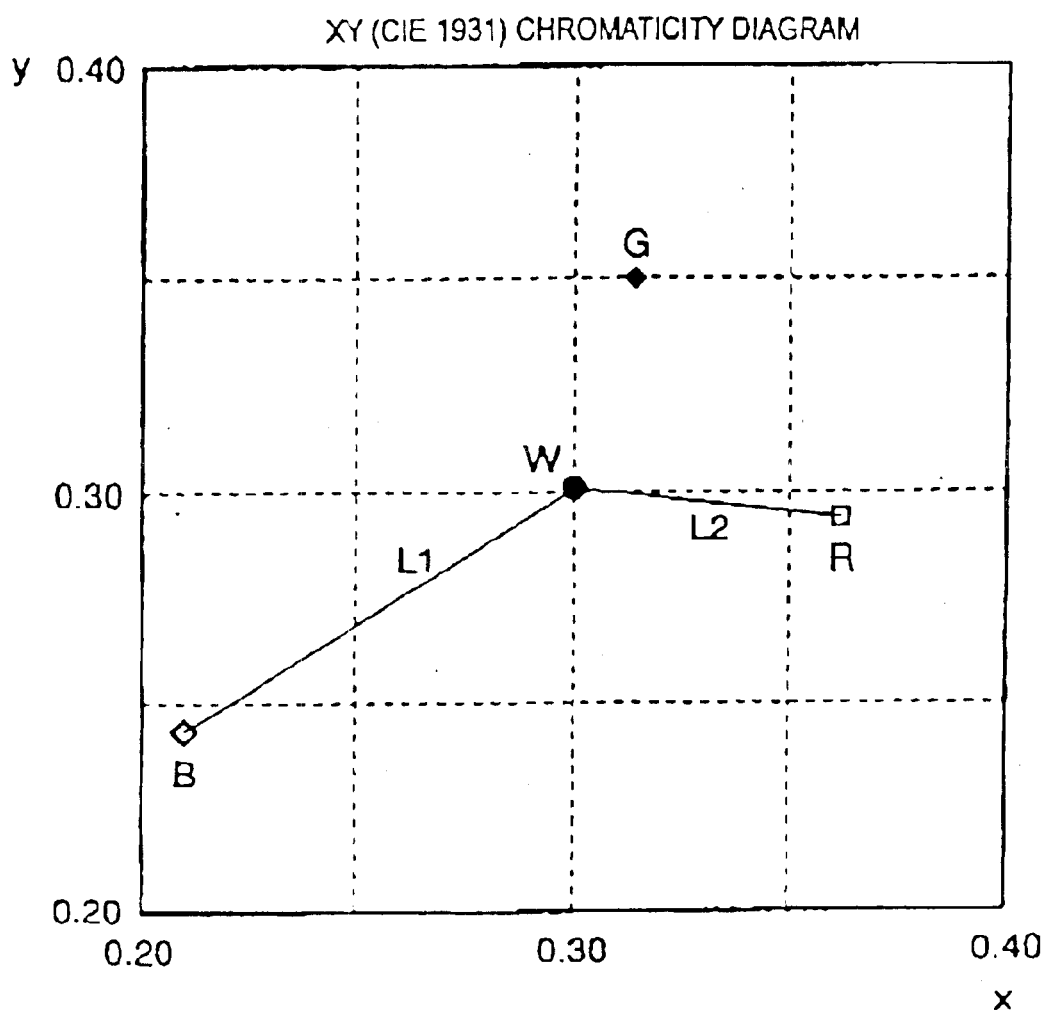

[Fig. 26]
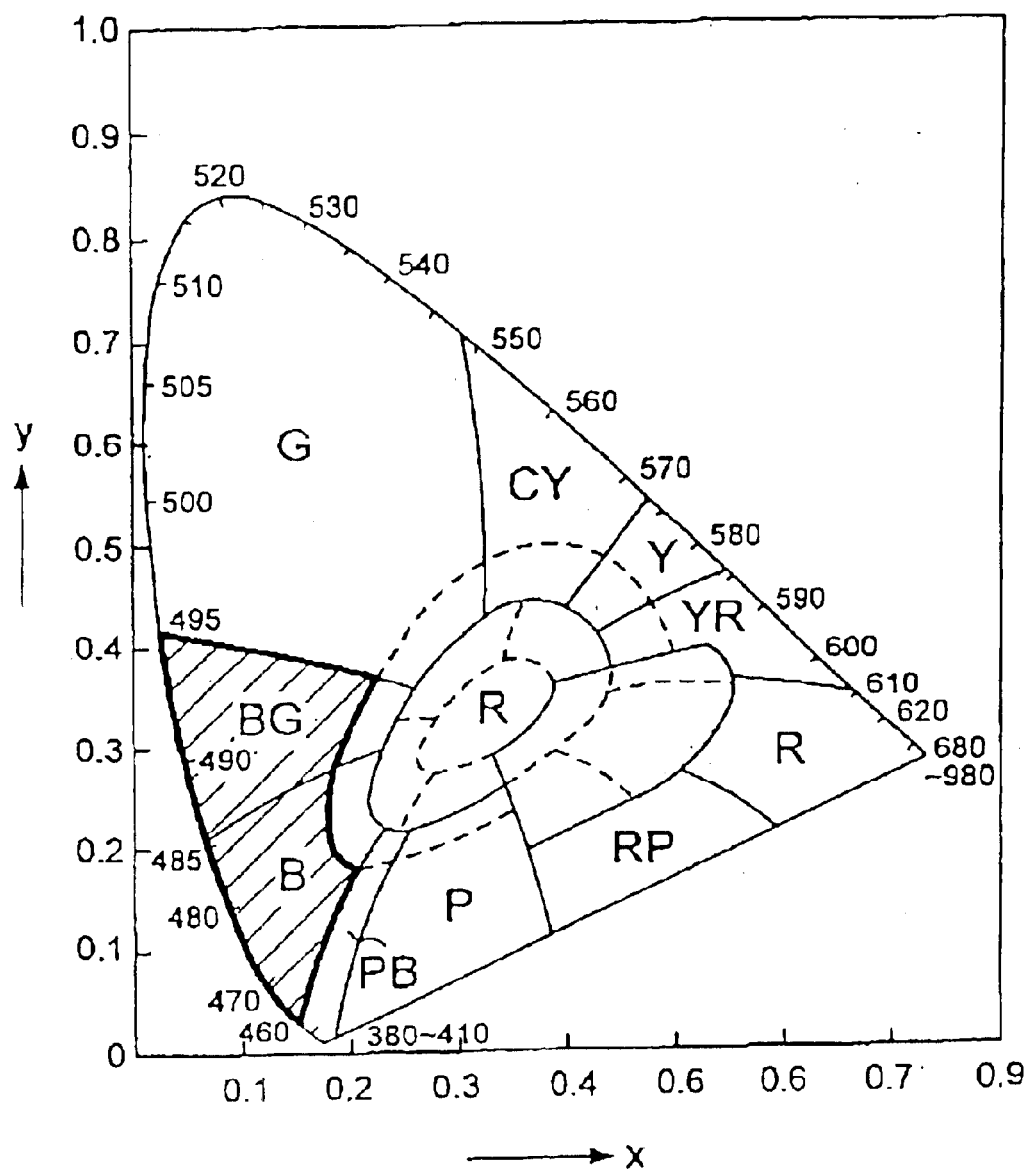

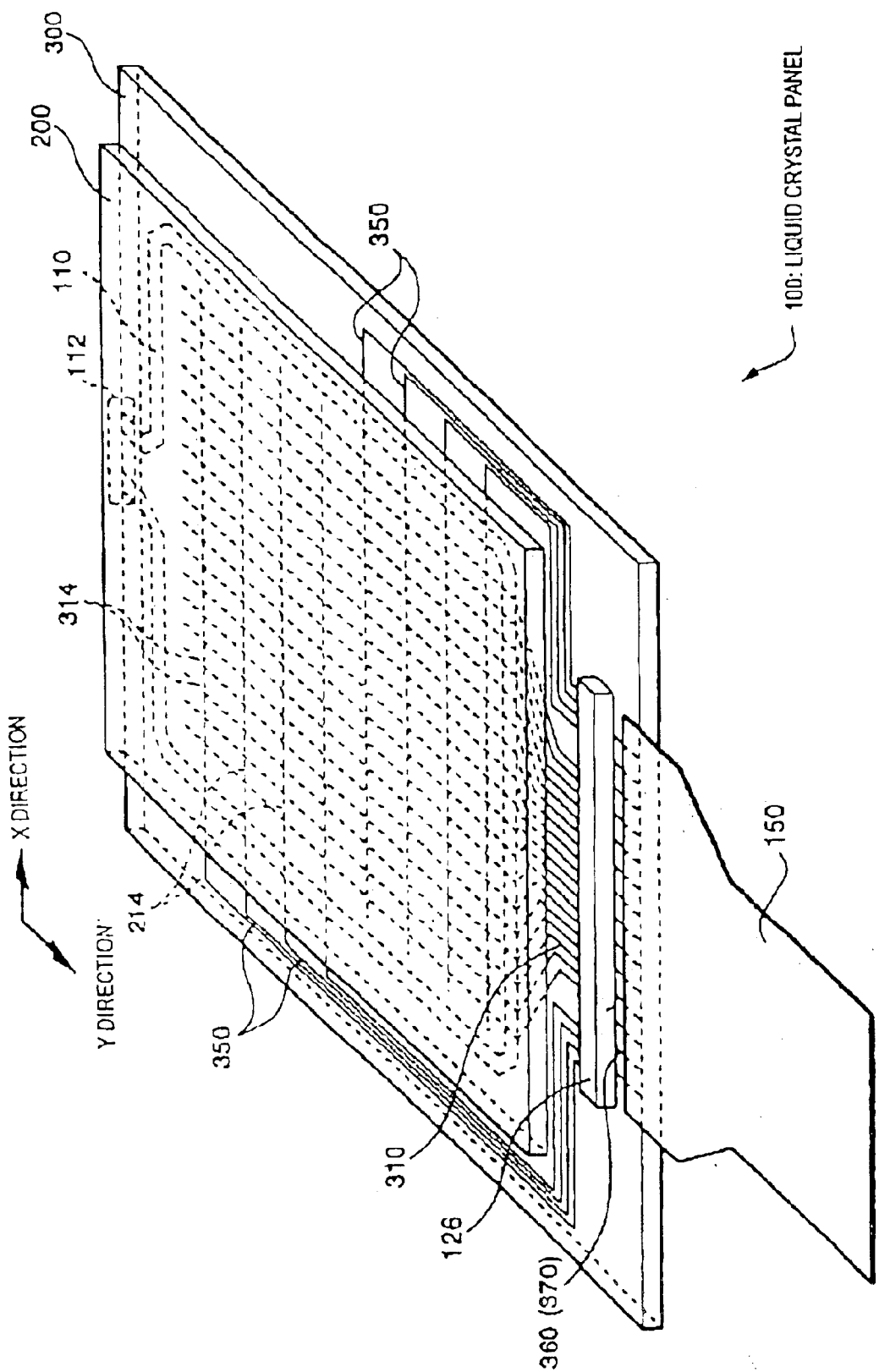
[Fig. 27]

[Fig. 28]
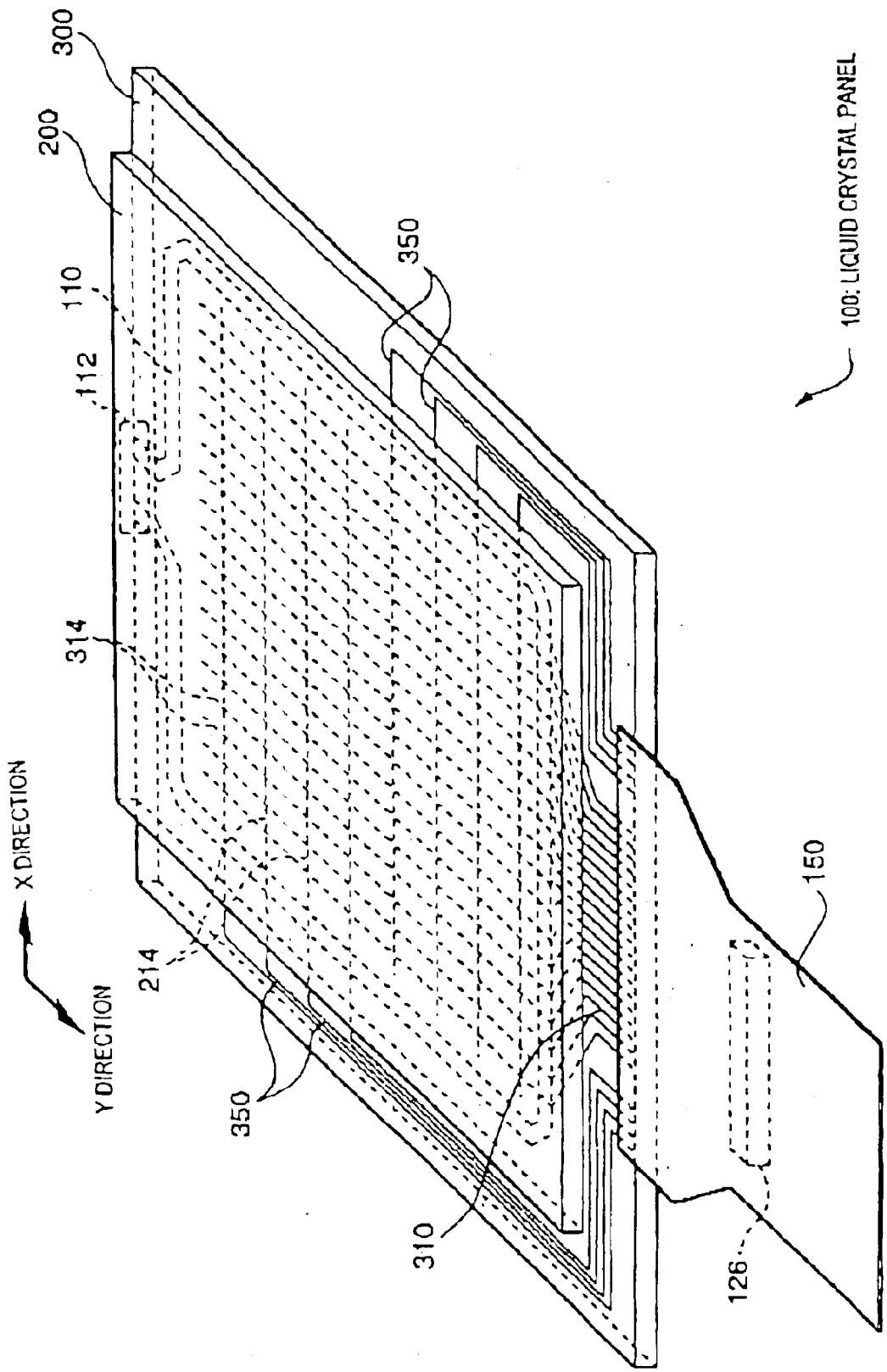

[Fig. 29]
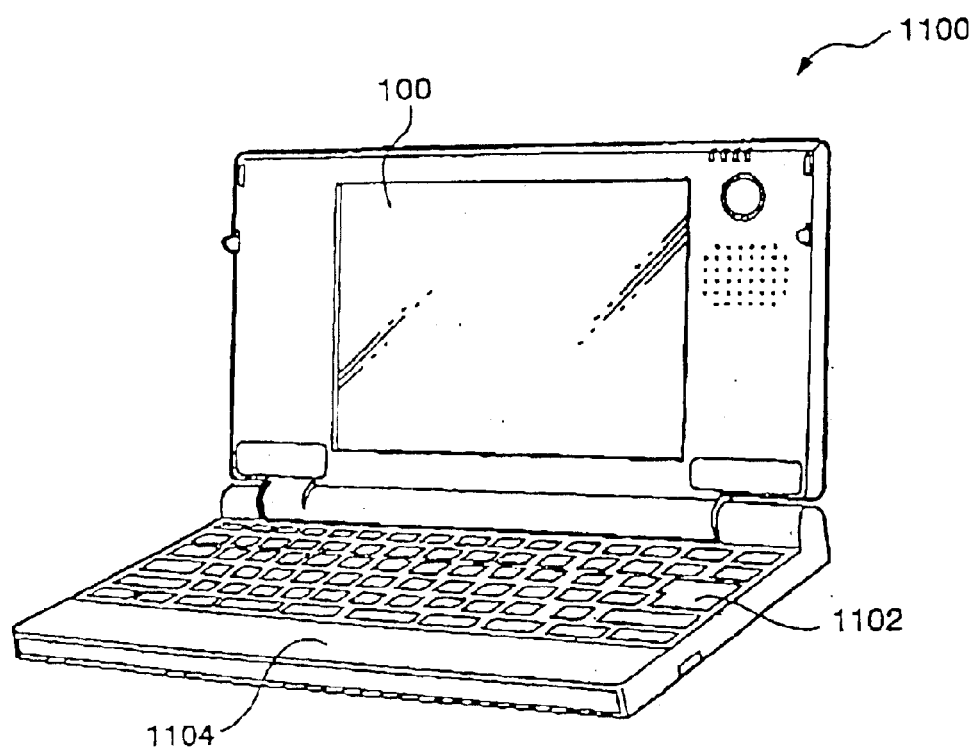

[Fig.30]
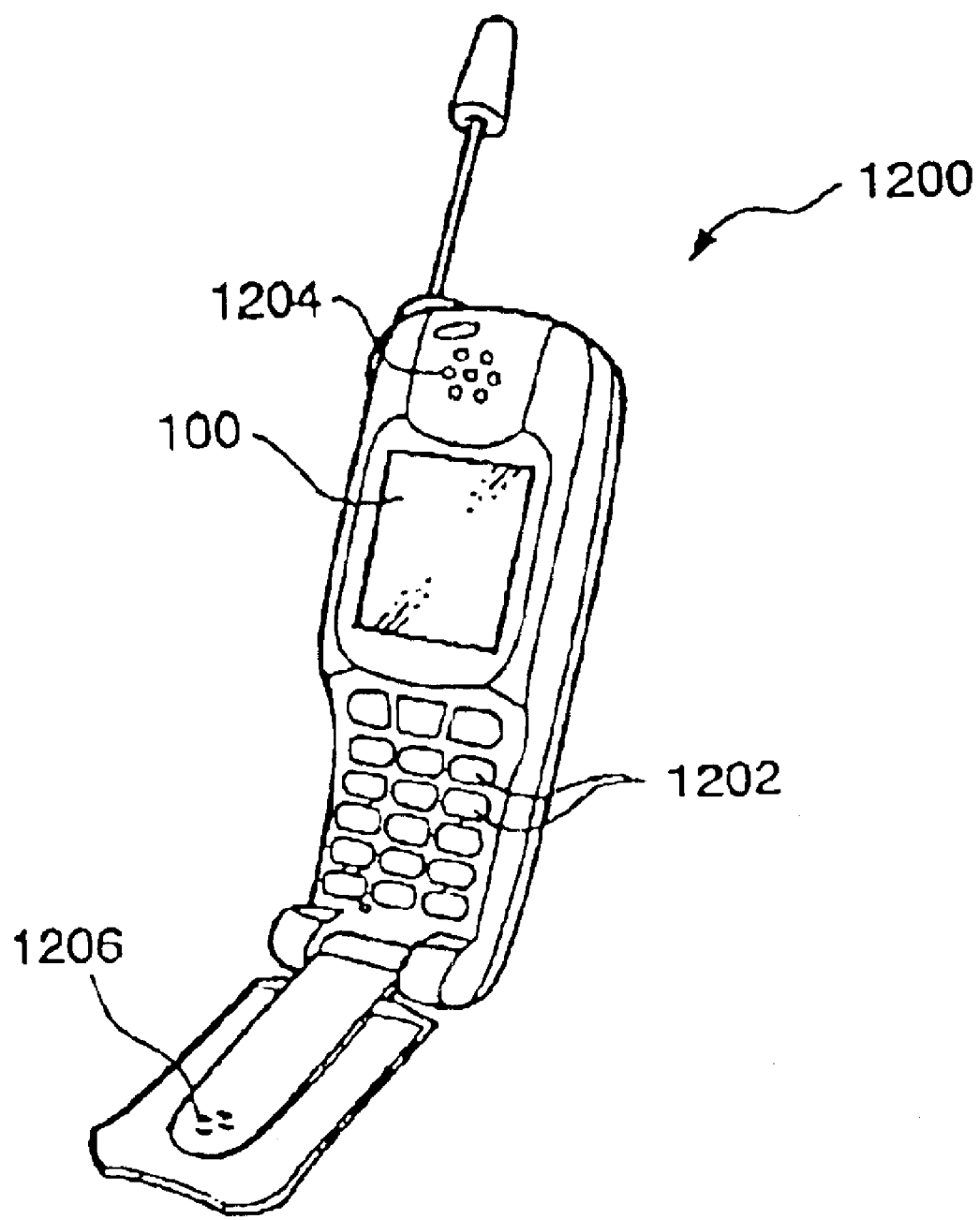

[Fig. 31]
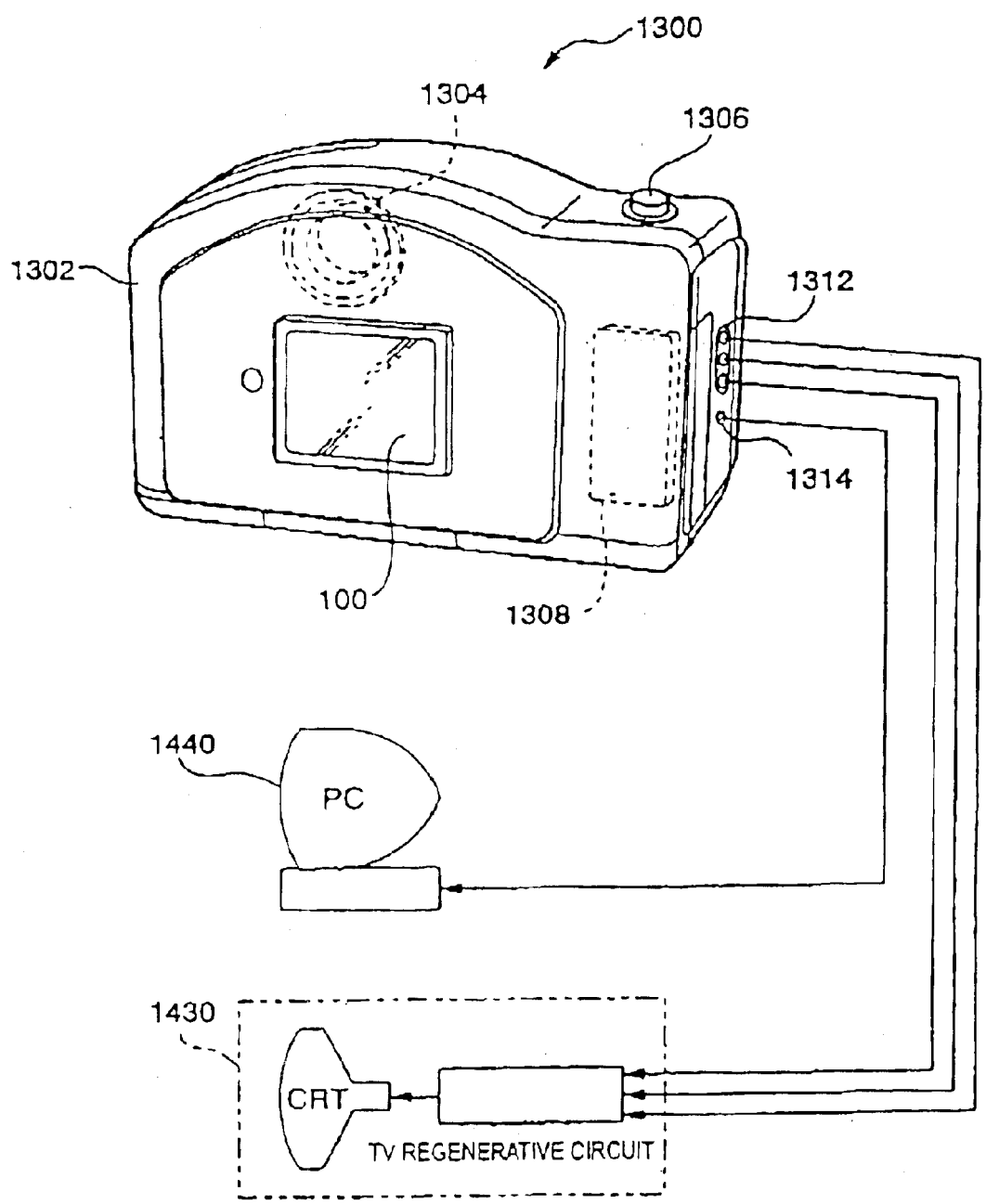

LIQUID CRYSTAL DEVICE, METHOD FOR MAKING THE SAME, AND ELECTRONIC APPARATUS

CROSS-REFERENCE TO RELATED APPLICATIONS

This application is a divisional of U.S. patent application Ser. No. 09/865,197 filed on May 24, 2001. This application claims the benefit of Japanese Patent Application 2000-154697, filed May 25, 2000; Japanese Patent Application 2000-154699, filed May 25, 2000; and Japanese Patent Application 2001-103496, filed Apr. 2, 2001. The disclosures of the above application are incorporated herein by reference.

TECHNICAL FIELD OF THE INVENTION

The present invention relates to reflective and transflective liquid crystal devices which use silver alloys and the like to reflect light, to a method for making the same, and to electronic apparatuses using the liquid crystal display devices as display sections.

DESCRIPTION OF THE RELATED ART

As is well known, liquid crystal devices do not emit light but performs display by controlling the polarization state of light. Thus, it is necessary that the configuration be such that light is incident on a panel of the liquid crystal display device, and in this regard, they are quite different from other display devices, such as electroluminescent devices and plasma display devices.

Herein, the liquid crystal devices are classified into two types, that is, a transmissive type in which a light source is provided behind the panel and the light passing through the panel is observed by a viewer, and a reflective type in which the light incident from a viewer side and reflected by a panel is observed by a viewer.

In the transmissive type, the light emitted from the light source provided at the rear side of the panel is introduced to the entire panel through a light guide plate. Then, the light passes through a polarizer, a back substrate, an electrode, a liquid crystal, another electrode, a viewer-side substrate, and another polarizer and is observed by a viewer.

On the other hand, in the reflective type, the light incident on the panel passes through a polarizer, a viewer-side substrate, an electrode, a liquid crystal, and another electrode, is reflected by a reflective film, and passes through the path in the reverse direction, and is observed by a viewer.

As described above, the reflective type needs two paths including an incident path and a reflected path and large optical losses occur in both paths. Compared to the transmissive type, the amount of light from the surrounding environment (external light) is less than that of a light source disposed at the rear side of the panel. Since only a small amount of light is observed by the viewer, the display becomes dim. However, the reflective type also has noticeable advantages, such as high outdoor visibility under sunlight and an ability to display without a light source, compared with the transmissive type. Thus, the reflective liquid crystal display devices are widely used in display sections of portable electronic apparatuses and the like.

The reflective type, however, has a notable disadvantage in that the viewer cannot see the display when insufficient natural illumination is provided from the environment. In recent years, a transflective type has appeared in which a backlight is provided at the rear face of a panel, and a reflective film not only reflects the light incident from the viewer's side but also transmits some of the light from the rear face. This transflective type functions both as a transmissive type by switching on the backlight to ensure visibility of the display when there is insufficient external light and as a reflective type by switching off the backlight in order to reduce power consumption when there is sufficient external light. This means, the transmissive type or the reflective type is selected depending on the intensity of the external light to ensure visibility of the display and to reduce power consumption.

In the reflective type and the transflective type, aluminum has been generally used as a material for the reflective film. However, in recent years, the use of elemental silver or a silver alloy primarily composed of silver (hereinafter referred to as merely "silver alloy") has been investigated to improve reflectance for achieving bright display.

However, in a liquid crystal display device, a problem arises in that the reflectance of the reflective film formed of silver alloy or the like decreases when the film is subjected to a high-temperature treatment.

The present invention has been realized in view of the above circumstances. It is an object thereof to provide a liquid crystal device having a reflective film of a silver alloy or the like in which a decrease in reflectance does not occur during a high-temperature treatment, a method for making the device, and an electronic apparatus.

SUMMARY OF THE INVENTION

The present inventor concluded that a decrease in reflectance of the reflective film, which is composed of a silver alloy or the like, during the high-temperature treatment is caused by the crystal grain growth in the reflective film during the high-temperature treatment.

According to an aspect of the present invention, a liquid crystal device comprises a first substrate and a second substrate opposing each other and a liquid crystal enclosed in a gap between the first substrate and the second substrate, and the liquid crystal device further comprises a reflective film which is provided on the first substrate and contains silver, a protective film provided on the reflective film, a first transparent electrode provided on the protective film, and an alignment film provided on the first transparent electrode. According to such a configuration, the protective film is formed on the entire reflective film composed of silver alloy or the like. Since crystal grain growth in the reflective film is suppressed even if a high-temperature treatment of the alignment film is employed after the formation of the reflective film, a decrease in reflectance is prevented.

In this configuration, it is preferable that the liquid crystal device further comprises a first lead provided on the first substrate, wherein the first lead has a metal film, and the average diameter of the crystal grains in the metal film is larger than that of the crystal grains in the reflective film. Since a decrease in reflectance does not arise problems in the first lead, the resistance of this lead can be reduced by growing the crystal grains or by including large crystal grains.

It is preferable that the average diameter of the crystal grains in the reflective film be in the range of 0.1 nm to 6.0 nm, and the average diameter of the crystal grains in the metal film be in the range of 2.0 nm to 20 nm. By independently controlling the average diameters of the crystal grains in the reflective film and the metal film, both the reflective film and the lead exhibits optimized functions thereof.

Preferably, the metal film of the first lead is provided on the reflective film. That is, the metal film of the first lead is provided after the reflective film.

Preferably, the first lead further comprises a metal oxide film deposited on the metal film. The metal film is covered by the metal oxide film which is chemically more stable, and thus is prevented from corrosion.

In the configuration in which the liquid crystal device has the first lead, the liquid crystal device preferably further comprises a second transparent electrode provided on the second substrate, and a driver IC for supplying output signals to the first lead, the first lead being connected to the second transparent electrode with a conductor. Since the second transparent electrode provided on the second substrate is connected to the first lead provided on the first substrate by the conductor, all leads can be arranged on the first substrate side. The driver IC provided for supplying the output signals to the first lead contributes to a reduction in connections to the exterior.

Preferably, the metal film of the first lead is formed at a portion other than the connection to the driver IC so that the metal film is not provided at a portion to which stress is applied when the adhesiveness of the metal film to the substrate is insufficient.

In the configuration in which the liquid crystal device has the first lead, the liquid crystal device may further comprise a second lead provided on the first substrate, and a driver IC for driving the liquid crystal, wherein the second lead comprises a metal film, and an input signal is supplied to the driver IC through the second lead.

When the input signal is supplied to the driver IC through the second lead, the metal film is preferably formed at a portion other than the connection to the driver IC, since the adhesiveness of the metal film to the substrate is insufficient, as described above.

When the liquid crystal device is provided with the second lead, the liquid crystal device preferably further comprises an external circuit board for supplying the input signal to the driver IC, wherein the external circuit board is connected to the second lead, and the metal film is formed at a portion other than the connection to the external circuit board. Separation of the metal film is thereby prevented when the external circuit board is repaired.

The liquid crystal device may further comprises a first lead connected to the first transparent electrode, and a driver IC connected to the first lead, wherein the first lead comprises a metal film. In this configuration, the driver IC supplies signals to the first transparent electrode through the first lead.

Preferably, the metal film of the first lead is formed at a portion other than the connection to the driver IC, since the adhesiveness of the metal film to the substrate may be insufficient.

Alternatively, when the first lead is connected to the first transparent electrode, the liquid crystal device may further comprises a second lead provided on the first substrate, wherein the second lead comprises a metal film, and an input signal is supplied to the driver IC through the second lead.

When the second lead is provided, the liquid crystal device may further comprises an external circuit board supplying an input signal to the second lead, wherein the metal film of the second lead is formed at a portion other than the connection to the external circuit board.

Since an electronic apparatus according to an aspect of the present invention comprises the above liquid crystal device, a decreased in reflectance of the reflective film is suppressed, enabling bright display.

When the reflective film contains silver, the reflectance-vs.-wavelength characteristics thereof are not as flat as those of aluminum which is generally used, and the reflectance decreases at the lower wavelength end. As a result, the light reflected by the reflective conductive film containing silver less contains the blue light component and thus is yellowish. According to an aspect of the present invention, a liquid crystal device comprises a first substrate and a second substrate opposing each other and a liquid crystal enclosed in a gap between the first substrate and the second substrate; and the liquid crystal device further comprises a reflective film which is provided on the first substrate and contains silver, and a protective film provided on the reflective film, wherein the reflectance of the protective film for (blue) light at the shorter wavelength end of visible light is higher than that for (green and red) light at the longer wavelength end. In such a configuration, large amounts of blue light components are reflected by the protective film before being reflected by the reflective film; hence, the light obtained by recombining the light reflected by the protective film and the light reflected by the reflective film containing silver is not yellowish.

The protective film may contain titanium oxide and preferably has a refractive index of 1.8 or more.

In order to obtain reflected light which is not yellowish, a correction using color layer is also useful, instead of the above configuration such that large amounts of blue light components are reflected by the protective film. According to an aspect of the present invention, a liquid crystal device comprises a first substrate and a second substrate opposing each other and a liquid crystal enclosed in a gap between the first substrate and the second substrate; and the liquid crystal device further comprises a reflective film which is provided on the first substrate and contains silver; first transparent electrodes provided on the reflective film, and second transparent electrodes provided on the second substrate, wherein dots are formed corresponding to crossings of the first transparent electrodes and the second transparent electrodes, a plurality of the dots defining one pixel, different color layers are assigned to the dots defining said one pixel, the color layers containing a blue color layer and a red color layer, and the distance from the white coordinate point to the coordinate point of the light which passes through the blue color layer is larger than the distance from the white coordinate point to the coordinate point of the light which passes through the red color layer in an xy chromaticity diagram (CIE1931). Since the conductive layer enhances the blue light compared to the red light in this configuration, the reflected light is not yellowish.

According to an aspect of the present invention, a liquid crystal device comprises a first substrate and a second substrate opposing each other and a liquid crystal enclosed in a gap between the first substrate and the second substrate; and the liquid crystal device further comprises a reflective film which is provided on the first substrate and contains metal; a first transparent electrode deposited on the reflective film; and a lead provided on the first substrate, wherein the lead comprises a metal film, and the average diameter of the crystal grains in the metal film is larger than that of the crystal grains in the reflective film.

In such a configuration, the liquid crystal device preferably further comprises a first extending region which is provided at one side of the first substrate and which does not overlap the second substrate, and a second extending region which is provided at a side crossing said one side of the first substrate and which does not overlap the second substrate, wherein the lead is provided over the first extending region and the second extending region.

According to an aspect of the present invention, a method for making a liquid crystal device comprising a first substrate and a second substrate opposing each other and a liquid crystal enclosed in a gap between the first substrate and the second substrate, the method comprises the steps of: providing a reflective film containing silver on the first substrate; providing a protective film on the reflective film; providing a first transparent electrode on the protective film; and providing an alignment film on the first transparent electrode. Since crystal grain growth is suppressed in the reflective film during a high-temperature treatment of the alignment film after the reflective film is formed, the reflectance does not decrease.

Preferably, the method further comprises the step of providing a first lead having a metal film on the first substrate, wherein the average diameter of the crystal grains in the metal film is larger than that of the crystal grains in the reflective film.

According to an aspect of the present invention, a method for making a liquid crystal device comprising a first substrate and a second substrate opposing each other and a liquid crystal enclosed in a gap between the first substrate and the second substrate, the method comprises the steps of providing a reflective film containing silver on the first substrate, and providing a protective film on the reflective film, wherein the reflectance for light at a shorter wavelength end in visible light of the protective film is higher than that for light at a longer wavelength end. Since large amounts of blue light components are reflected by the protective film before the component is reflected by the reflective layer, the light obtained by recombining the light reflected by the protective film and the light reflected by the reflective film containing silver is not yellowish.

The protective film may contain titanium oxide and may have a refractive index of 1.8 or more.

BRIEF DESCRIPTION OF THE DRAWINGS

FIG. 1 is an isometric view illustrating an overall configuration of a liquid crystal display device in accordance with a first embodiment.

FIG. 2 is a partial cross-sectional view when a liquid crystal display panel constituting the liquid crystal device is broken along the X direction in FIG. 1.

FIG. 3 is a partial cross-sectional view when the liquid crystal panel is broken along the Y direction in FIG. 1.

FIG. 4 is a plan view illustrating the configuration of pixels and the configuration of the vicinity of a sealant in the liquid crystal panel.

FIG. 5 is a cross-sectional view taken from line A-A' in FIG. 4.

FIG. 6 is a partial cross-sectional view illustrating the vicinity of the region for mounting the driver IC in the liquid crystal panel.

FIG. 7 is a partial plan view illustrating the vicinity of the region for mounting the driver IC in a backside substrate of the liquid crystal panel.

FIGS. 8(a) to 8(e) are cross-sectional views of a manufacturing process of the backside substrate in the liquid crystal panel.

FIGS. 9(f) to 9(i) are cross-sectional views of the manufacturing process of the backside substrate in the liquid crystal panel.

FIG. 10 is a graph illustrating reflectance characteristics of silver and aluminum.

FIG. 11 is a partial cross-sectional view when a liquid crystal panel of a liquid crystal display device according to a second embodiment of the present invention is broken along the X direction.

FIG. 12 is a partial cross-sectional view when the liquid crystal panel is broken along the Y direction.

FIG. 13 is a cross-sectional view illustrating a configuration of the lead portion of the liquid crystal panel.

FIG. 14 is a partial cross-sectional view illustrating the vicinity of a region for mounting a driver IC in the liquid crystal panel.

FIGS. 15(a) to 15(f) are cross-sectional views of a manufacturing process of the backside substrate in the liquid crystal panel.

FIGS. 16(g) and 16(h) are cross-sectional views of the manufacturing process of the backside substrate in the liquid crystal panel.

FIG. 17 is a partial cross-sectional view when a liquid crystal panel according to a modification of the first or second embodiment is broken along the X direction.

FIG. 18 is a partial cross-sectional view when a liquid crystal panel according to a third embodiment of the present invention is broken along the X direction.

FIG. 19 is a partial cross-sectional view when the liquid crystal panel is broken along the Y direction.

FIGS. 20(a) to 20(e) are cross-sectional views of a manufacturing process of the backside substrate in the liquid crystal panel.

FIGS. 21(f) to 21(i) are cross-sectional views of the manufacturing process of the backside substrate in the liquid crystal panel.

FIG. 22 is a partial cross-sectional view when a liquid crystal panel according to a modification of the third embodiment is broken along the X direction.

FIG. 23 is a partial cross-sectional view when a liquid crystal panel according to another modification is broken along the Y direction.

FIG. 24 is a graph of the properties of color filters in a liquid crystal panel of a liquid crystal display device in accordance with a fourth embodiment.

FIG. 25 is an xy chromaticity diagram of color light based on the color filters.

FIG. 26 is a graph illustrating an appropriate region as blue light based on the color filters in the xy chromaticity diagram.

FIG. 27 is an isometric view illustrating another configuration of the liquid crystal panel in accordance with the embodiments.

FIG. 28 is an isometric view of a modification of the liquid crystal panel.

FIG. 29 is an isometric view of a personal computer as an example of the electronic apparatuses using the liquid crystal panel in accordance with the embodiments.

FIG. 30 is an isometric view of a portable phone as an example of the electronic apparatuses using the liquid crystal panel.

FIG. 31 is an isometric view at the backside of a digital still camera as an example of the electronic apparatuses using the liquid crystal panel.

DETAILED DESCRIPTION OF THE PREFERRED EMBODIMENTS

The Embodiments of the present invention will be described with reference to the drawings.

A liquid crystal device in accordance with a first embodiment of the present invention will now be described. This liquid crystal device is of a transflective type which functions as a reflective type when external light is sufficient and as a transmissive type by switching on a backlight when the external light is insufficient.

FIG. 1 is an isometric view illustrating an overall configuration of a liquid crystal panel in the liquid crystal display device. FIG. 2 is a partial cross-sectional view when the device is broken along the X direction in FIG. 1, and FIG. 3 is a partial cross-sectional view when the device is broken along the Y direction in FIG. 1.

As shown in these drawings, the liquid crystal panel 100 constituting the liquid crystal display device includes a viewer-side substrate 200 lying at the viewer side and a backside substrate 300 lying at the back side, these substrates being bonded to each other at a predetermined gap with a sealant 110 which contains conductive particles 114 and also functions as a spacer. This gap is filled with, for example, a twisted nematic (TN) liquid crystal 160. The sealant 110 is formed on either substrate to form a frame along the peripheries of the inner face of the viewer-side substrate 200 and has an opening for enclosing the liquid crystal 160. This opening is sealed with a sealant 112 after the liquid crystal is enclosed.

A plurality of common electrodes 214 extends in the X direction on the inner face of the viewer-side substrate 200, whereas a plurality of segment electrodes 314 extends in the Y direction on the inner face of the backside substrate 300. In this embodiment, a voltage is applied to the liquid crystal 160 through these electrodes at regions in which the segment electrodes (first transparent electrodes) 314 and the common electrodes (second transparent electrodes) 214 cross each other, and this crossing regions function as sub-pixels.

In the backside substrate 300, a driver IC 122 for driving the common electrodes 214 and a driver IC 124 for driving the segment electrodes 314 are mounted on two sides which protrude from the viewer-side substrate 200 by a chip-on-glass (COG) technology, as described below. At the exterior of the region for mounting the driver IC 124 in these two sides, a flexible printed circuit (FPC) board 150 is bonded.

Each common electrode 214 formed on the viewer-side substrate 200 is connected to one end of each lead (first lead) 350 which is formed on the backside substrate 300, via conductive particles 114 contained in the sealant 110. On the other hand, the other end of the lead 350 is connected to an output bump (protruding electrode) of the driver IC 122. That is, the driver IC 122 supplies common signals through the leads 350, the conductive particles 114, and the common electrodes 214 in that order. Input bumps of the driver IC 122 and the FPC board (external circuit board) 150 are connected to each other with leads (second leads) 360.

The segment electrodes 314 formed on the backside substrate 300 are connected to the output bump of the driver IC 124. That is, the driver IC 124 directly supplies segment signals to the segment electrodes 314. The input bump of the driver IC 124 and the FPC board 150 are connected with leads (second leads) 370.

As shown in FIGS. 2 and 3, in the liquid crystal panel, a polarizer 121 and a retardation film 123 are provided on the proximal side (viewer side) of the viewer-side substrate 200. Furthermore, a polarizer 131 and a retardation film 133 are provided on the backside (away from the viewer) of the backside substrate 300 (not shown in FIG. 1). In addition, a backlight (not shown in the drawings) is provided behind the backside substrate 300 so that the liquid crystal device is used as a transmissive type when the external light is insufficient.

A display region in the liquid crystal panel 100 will now be described in detail. The viewer-side substrate 200 will be described in detail. As shown in FIGS. 2 and 3, the retardation film 123 and the polarizer 121 are bonded onto the outer face of the viewer-side substrate 200. The inner face of the viewer-side substrate 200 is provided with a shading film 202 to prevent color mixing between sub-pixels and to function as a frame defining the display region. Moreover, color filters (color layers) 204 are arranged into a predetermined array corresponding to crossing regions between the common electrodes 214 and the segment electrodes 314 (corresponding to openings of the shading film 202). In this embodiment, red (R), green (G), and blue (B) color filters 204 have a stripe arrangement which is suitable for displaying data (see FIG. 4), and three R, G, and B sub-pixels constitute one substantially square pixel. However, the present invention is not limited to this configuration.

A planarization film 205 formed of an insulating material planarizes steps between the shading film 202 and the color filters 204, and a plurality of stripped common electrodes 214 composed of a transparent conductive material such as ITO extends in the X direction (the transverse direction in FIG. 2 and the longitudinal direction in FIG. 3) on the planarized plane.

An alignment film 208 composed of polyimide or the like is formed on the planarization film 205 and the common electrodes 214 and is subjected to rubbing treatment in a predetermined direction. Since the shading film 202, the color filters 204, and the planarization film 205 are unnecessary in regions other than the display region, these are not provided in the vicinity of the region of the sealant 110.

The configuration of the backside substrate 300 will now be described. The retardation film 133 and the polarizer 131 are bonded to the outer face of the backside substrate 300. Furthermore, an underlying film 301 is formed on the entire inner face of the backside substrate 300. In addition, a reflective film 302 is formed on the underlying film 301. The reflective film 302 is formed of elemental silver or a silver alloy primarily composed of silver and is deposited by low-temperature sputtering. The reflective film 302 reflects light incident from the viewer-side substrate 200 towards the viewer-side substrate 200. Preferably, the reflective film 302 has a surface causing irregular reflection rather than a complete mirror surface. Although the reflective film 302 is preferably formed so as to have an uneven surface to some extent, the description thereof is omitted in the present invention since the description does not relates to the present invention directly.

The reflective film 302 is provided with two openings 309 per one sub-pixel for transmitting light from the backlight so that the device can be used also as a transmissive type (see FIG. 4). The underlying film 301 provided on the backside substrate 300 improves adhesiveness of the reflective film 302 to the substrate 300.

An insulating protective film 303 is provided on the entire inner face so as to cover the reflective film 302 provided with the openings 309. The protective film 303 protects the reflective film 302, prevents a decrease in reflectance of the reflective film 302, and reflects large amounts of blue light components of the light incident from the viewer-side substrate 200.

In addition, strip segment electrodes 314 composed of a transparent conductive material such as ITO extend in the Y direction on the protective film 303. An alignment film 308 composed of polyimide or the like is formed on the segment electrodes 314 and the protective film 303, and is subjected to rubbing treatment in a predetermined direction before the backside substrate 300 is bonded to the viewer-side substrate 200.

Since the alignment film 308 and the underlying reflective film 302 are unnecessary in regions other than the display region, these are not provided in the vicinity and the exterior of the frame of the sealant 110. A manufacturing process of the backside substrate 300 will be described in detail after various leads are described.

The vicinity of the region of the sealant 110 in the liquid crystal panel 100 will be described with reference to FIGS. 2, 3, 4, and 5. FIG. 4 is a perspective plan view of a detailed configuration of leads in the vicinity of the side for mounting the driver IC 122 in the region of the sealant 110 when viewed from the viewer, and FIG. 5 is a cross-sectional view taken from line A-A' in FIG. 4.

The common electrodes 214 and the leads 350 will be described. As shown in these drawings, the common electrodes 214 on the viewer-side substrate 200 extend to the region of the sealant 110, whereas transparent conductive films 354 constituting the leads 350 extend to the region of the sealant 110 on the backside substrate 300 so as to face the common electrodes 214. Thus, given amounts of given amounts of spherical conductive particles 114 dispersed in the sealant 110 function as spacers and electrically connect the common electrodes 214 and the corresponding transparent conductive films 354.

Herein, each lead 350 electrically connects the corresponding common electrode 214 and the output terminal of the driver IC 122 at the backside substrate 300 and has a laminate configuration of a reflective conductive film 352 and the corresponding transparent conductive film 354. The reflective conductive film 352 is formed by patterning a conductive layer of elemental silver or a silver alloy primarily composed of silver which is deposited by high-temperature sputtering or the like. That is, the reflective conductive film 352 and the reflective film 302 in this embodiment are common with regard to patterning of conductive layers composed of silver alloy, but are different in deposition process. The transparent conductive films 354 are formed by patterning the conductive layer of ITO or the like which is the same as that of the segment electrodes 314 so as to be one size larger than the reflective conductive films 352 and, in detail, as shown in FIG. 5, so as to come into contact with the protective film 303 at the edge portion. As shown in FIGS. 2, 3, and 4, the reflective conductive films 352 are not formed and only the transparent conductive films 354 are formed in the region for forming the sealant 110.

Next, extraction of the segment electrodes 314 will be described. As shown in FIG. 3, each segment electrode 314 is formed on the protective film 303, is extracted to the exterior of the frame of the sealant 110, is deposited on a reflective conductive film 312 which is obtained by patterning the conductive layer of the same silver alloy as that of the reflective conductive films 352, and is extracted to the output bump of the driver IC 124 as a lead 310. The segment electrode 314 is patterned so as to be one size larger than the laminated reflective conductive film 312 at the exterior of the frame of the sealant 110 and to come into contact with the protective film 303 at the edge portion protruding from the reflective conductive film 312, as shown by parentheses in FIG. 5, in cross-sectional view.

In this embodiment, the reflective film 302 is electrically floating in the interior of the frame of the sealant 110. Thus, it is preferable that the protective film 303 be formed so that the distance between the reflective film 302 and the segment electrode 314 is approximately 2 μm and each segment electrode 314 and the reflective film 302 do not cause capacitive coupling.

The diameter of the conductive particle 114 in FIGS. 2 and 3 is larger than the actual size for description and only one particle is depicted in the width direction of the sealant 110. In the actual configuration, however, many conductive particles 114 are arranged in the width direction of the sealant 110.

Next, regions for mounting the driver ICs 122 and 124 and the vicinity of a region for connecting the FPC board 150 in the backside substrate 300 will be described. FIG. 6 is a cross-sectional view which primarily illustrates leads among configurations of these regions, and FIG. 7 is a plan view which illustrates the lead configuration in the region for mounting the driver IC 122, when viewed from the viewer. Although, the backside substrate 300 is provided with the leads 350, 360 and 370, as well as the segment electrodes 314, as described above, only the leads 350 and 360 relating to the driver IC 122 will be described in this embodiment.

As shown in these drawings, the leads 350 for supplying the common signal from the driver IC 122 to the common electrodes 214 are composed of laminate films including the reflective conductive films 352 and the transparent conductive films 354. The region for mounting the driver IC 122, however, includes only the transparent conductive film 354 and does not include the reflective conductive film 352, as in the region for forming the sealant 110.

Each lead 360 for supplying various signals, fed from the FPC board 150, to the driver IC 122 is composed of a laminate film including a reflective conductive film 362 and a transparent conductive film 364, like the lead 350. The reflective conductive film 362 is formed by patterning the conductive layer of a silver alloy which is the same as the layer for the reflective conductive film 352. The transparent conductive film 364 is formed by patterning the conductive layer of ITO or the like which is the same as the layer for the segment electrodes 314 and the transparent conductive films 354 such that the transparent conductive film 364 is one size larger than the reflective conductive film 362 and more specifically such that the edge portion of the transparent conductive film 364 protruding from the reflective conductive film 362 comes into contact with the protective film 303, as shown in parentheses in FIG. 5, in cross-sectional view. In the region for mounting the driver IC 122 and the region for bonding the FPC board 150 (not shown in FIG. 7), the leads 360 are provided with only the transparent conductive film 364 and thus not provided with the reflective conductive film 362.

The driver IC 122 is COG-mounted to the leads 350 and 360, for example, by the following process. A plurality of electrodes is provided at the periphery of a face of the rectangular parallelepiped driver IC 122. A bump 129a or 129b composed of, for example, gold (Au) is preliminarily formed to each electrode. Then, an anisotropic conductive sheet of an adhesive 130, such as an epoxy adhesive, containing uniformly dispersed conductive particles 134 is placed onto the region for mounting the driver IC 122 on the backside substrate 300. The anisotropic conductive sheet is sandwiched by the driver IC 122 in which the face provided with the electrodes is arranged at the inner side and the backside substrate 300. After the driver IC 122 is positioned, pressure and heat are applied to the backside substrate 300 via the anisotropic conductive sheet.

As a result, in the driver IC 122, the output bump 129a which supplies the common signal and the input bump 129b which receives signals from the FPC board 150 are electrically connected to the transparent conductive films 354 constituting the leads 350 and the transparent conductive films 364 constituting the leads 360, respectively, via the conductive particles 134 in the adhesive 130. The adhesive 130 also functions as a sealant which protects the electrode-forming-face of the driver IC 122 from moisture, contamination, stress, etc.

The leads 350 and 360 relating to the driver IC 122 are exemplified above. The leads 310 relating to the driver IC 124 and the leads 370 supplying various signals fed from the FPC board 150 to the driver IC 124 have substantially the same configurations as those of the leads 350 and 360, as shown in parentheses in FIG. 5. That is, the leads 310 for supplying the segment signals from the driver IC 124 to the segment electrodes 314 are formed of a laminate film of the reflective conductive film 312 and the transparent conductive film 314, as described above. In the region for mounting the driver IC 124, only the transparent conductive film of the segment electrode 314 is provided and the reflective conductive film 312 is not provided. In other words, the reflective conductive film 312 is provided at a portion other than the connection to the driver IC 124.

Similarly, the leads 370 for supplying various signals fed from the FPC board 150 to the driver IC 124 is composed of a laminate of a reflective conductive film 372 and a transparent conductive film 374. The reflective conductive film 372 is formed by patterning the same conductive layer as that for the reflective conductive films 312, 352, and 362. The transparent conductive film 374 is formed by patterning the same conductive layer as that for the transparent conductive films 314, 354, and 364 such that the transparent conductive film 374 is one size larger than the reflective conductive film 372 and the edge thereof protruding from the reflective conductive film 372 comes into contact with the protective film 303 (see FIG. 5). In the region for mounting the driver IC 124 and the region for bonding the FPC board 150, only the transparent conductive film 374 of the lead 370 is provided and the reflective conductive film 372 is not provided. In other words, the reflective conductive film 372 is formed at a portion other than the connection to the driver IC 124 and the connection to the FPC board 150.

These leads 310 and 370 of such laminate films are connected to the driver IC 124 via the anisotropic conductive sheet, as in the driver IC 122.

The anisotropic conductive sheet is also used for connection of the FPC board 150 to the leads 360 and 370. A lead 154 formed on a substrate 152 of polyimide or the like of the FPC board 150 is electrically connected to the transparent conductive film 364 constituting the lead 360 and the transparent conductive film 374 constituting the lead 370 via conductive particles 144 in an adhesive 140.

A manufacturing process of the above liquid crystal display device and particularly of the backside substrate will be described with reference to FIGS. 8 and 9. The description is mainly focused to the segment electrode 314 and the lead 350 and the interior (display region) of the sealant frame, the sealant, and the exterior of the sealant frame are separately described.

As shown in FIG. 8(a), $Ta_2O_5$, $SiO_2$, or the like is deposited on the entire inner face of a backside substrate 300 by sputtering to form an underlying film 301. As shown in FIG. 8(b), a reflective conductive layer 302' composed of elemental silver or primarily composed of silver is deposited by sputtering or the like at a relatively low temperature (approximately 200° C.). The conductive layer 302' is composed of, for example, an APC alloy containing approximately 98% silver (Ag), platinum (Pt), and copper (Cu) by weight in this embodiment. An alloy containing silver, copper, and gold or an alloy containing silver, ruthenium (Ru), and copper may also be used. Then, as shown in FIG. 8(c), the conductive layer 302' patterned by photolithographic and etching processes to form an opening 309 and a reflective film 302.

As shown in FIG. 8(d), a protective film 303 containing, for example, titanium oxide is formed on the entire substrate to cover the reflective film 302. As shown in FIG. 8(e), a reflective conductive film 352' composed of elemental silver or primarily composed of silver is deposited on the protective film 303 by sputtering or the like at a relatively high temperature (approximately 400° C.). The reflective conductive film 352' is preferably composed of the APC alloy of silver, palladium, and copper, the silver-copper-gold alloy, or the silver-ruthenium-copper alloy, like the reflective film 302' for forming the reflective film 302.

As shown in FIG. 9(f), the reflective conductive film 352' is patterned by photolithographic and etching processes to form a reflective conductive film 352 constituting leads 350, and reflective conductive films 312, 362, and 372 constituting leads 310, 360, and 370, respectively. As shown in FIG. 9(g), a transparent conductive layer 314' of ITO or the like is deposited by a sputtering or ion plating process.

As shown in FIG. 9(h), the conductive layer 314' is patterned by photolithographic and etching processes to form segment electrodes 314 in the interior of the sealant frame and transparent conductive films 354, 364, and 374 in the exterior of the sealant frame. The peripheries of the transparent conductive films 354, 364, and 374 are not removed so as to come into contact with the protective film 303 such that the reflective conductive films 312, 352, 362, and 372 are not exposed. Since the surfaces of the reflective conductive films 312, 352, 362, and 372 are thereby not exposed after the conductive layer 314' is deposited, these layers are prevented from corrosion and separation.

After a polyimide solution is applied by coating or printing and is baked to form an alignment film 308. Furthermore, the alignment film 308 is subjected to rubbing treatment. Although not shown in the drawing, the resulting backside substrate 300 and a viewer-side substrate 200 having an rubbing-treated alignment film 208 are bonded to each other with a sealant 110 containing dispersed conductive particles 114. A liquid crystal 160 is dropwise supplied to the opening of the sealant 110 under vacuum. After the pressure is backed to normal pressure so that the liquid crystal 160 spreads over the interior of the sealant frame, the opening is sealed with a sealant 112. As described above, the driver ICs 122 and 124 and the FPC board 150 are mounted to complete the liquid crystal panel 100 shown in FIG. 1.

In this first embodiment, the conductive layer 302' forming the reflective film 302 is deposited at a low temperature in FIG. 8(b); hence, the reflectance thereof is high. Although this film is treated at relatively high temperatures in FIGS. 8(e) and 9(i), crystal grain growth in the reflective film 302 covered by the protective film 303 is suppressed, preventing a decrease in reflectance of the reflective film 302.

In contrast, the conductive layer 352' forming the reflective conductive film 352 is deposited at a high temperature, and is further treated at an elevated temperature in FIG. 9(i). Since the crystal grain size in the conductive layer 352' increases, the lead resistance thereof decreases. Accordingly, in this embodiment, the reflective film 302 maintains high reflectance while the reflective conductive films 312, 352, 362, and 372 exhibit reduced lead resistance.

It is confirmed by the present inventor that the average diameter of crystal grains in the reflective film 302 is in the range of 0.1 nm to 6.0 nm, whereas the average diameter of crystal grains in the reflective conductive films 312, 352, 362, and 372 is in the range of 2.0 nm to 20 nm.

Although the reflectance of the reflective conductive films 312, 352, 362, and 372 decreases due to the crystal grain growth, a decrease in reflectance does not arise problems, since the reflective conductive films are used as lead layers not as reflective films.

The display operation of the liquid crystal device in accordance with such a configuration will be described in brief. The driver IC 122 applies a selection voltage to common electrodes 214 in a predetermined order every horizontal scanning period, while the driver IC 124 supplies segment signals corresponding to the display information of one sub-pixel line which lies at these common electrodes 214 to the corresponding segment electrodes 314. The alignment of the liquid crystal 160 in the sub-pixels in this region is independently controlled based on the differences between the voltages applied to the common electrodes 214 and the voltages applied to the segment electrodes 314.

With reference to FIGS. 2 and 3, the external light from the viewer passes through the polarizer 121 and the retardation film 123 to be polarized to a predetermined state. The light passes through the viewer-side substrate 200, the color filters 204, the common electrodes 214, the liquid crystal 160, the segment electrodes 314, and the protective film 303, and reaches the reflective film 302. The light is reflected thereby and passes through the above route backward. Thus, in the reflective type, the amount of the light which is reflected by the reflective film 302, passes through the polarizer 121, and is visible by the viewer is independently controlled in each sub-pixel in response to a change in alignment of the liquid crystal 160 which is caused by the difference between the voltage applied to the corresponding common electrode 214 and the voltage applied to the corresponding segment electrode 314.

In the reflective type, a larger amount of shorter-wavelength (blue) light is reflected by the protective film 303 which lies above the reflective film 302 rather than by the reflective film 302. The reason for providing the protective film 303 in this embodiment is as follows. As shown in FIG. 10, the reflectance of the APC alloy used in the reflective film 302 in this embodiment is not so flat as that of aluminum (Al) which is generally used, and tends to decrease at the shorter wavelength end. As a result, the light reflected by the reflective film 302 less contains blue light components and thus is yellowish. If the reflective film 302 is used alone, color reproducibility would be adversely affected in a color display mode. Thus, the protective film 303 is provided so that large amounts of blue light components are reflected by the protective film 303 rather than by the reflective film 302. This configuration prevents all light reflected by the reflective conductive film 312 and the protective film 303 from becoming yellowish.

The present inventors experimented how the reflectance (by both the protective film 303 and the APC alloy reflective film 302) vs. wavelength characteristics change depending on the refractive index n as a parameter at the interface between the protective film 303 and the reflective film 302. The experimental results are shown in FIG. 10. The graph demonstrates that the reflectance is maintained at high levels compared with aluminum and the reflectance-vs.-wavelength characteristics are flat in practice when the refractive index n of the protective film 303 is 1.8 or more.

When a backlight (not shown in the drawing) lying at the rear face of the backside substrate 300 is turned on, the light from the backlight passes through the polarizer 131 and the retardation film 133 and is polarized to a predetermined state. The light further passes through the backside substrate 300, the openings 309, the protective film 303, the segment electrodes 314, the liquid crystal 160, the common electrodes 214, the color filters 204, the viewer-side substrate 200, and the polarizer 121, and is emitted towards the viewer. Thus, also, in the transmissive type, the amount of the light which passes through the openings 309 and the polarizer 121 and is observed by the viewer is independently controlled in each sub-pixel by a change in alignment of the liquid crystal 160 which is caused by the difference between the voltage applied to the corresponding common electrodes 214 and the voltage applied to the corresponding segment electrode 314.

Since the liquid crystal device in accordance with this embodiment functions as a reflective type when the external light is sufficient and a transmissive type by switching on the backlight when the external light is insufficient, and thus can perform display in both types. Since the reflective film 302 reflecting the light is formed of a silver alloy primarily composed of silver and is covered by the protective film 303 so as to moderate crystal grain growth in the silver alloy constituting the reflective film 302, light returning towards the viewer is increased due to high reflectance. Accordingly, this liquid crystal device performs bright display when this functions as a reflective type.

Since the leads 310, 350, 360, and 370 have laminate configurations which include the segment electrodes 314 and the transparent conductive films 354, 364, and 374, respectively, and the reflective conductive films 312, 352, 362, and 372, respectively, which are composed of the same conductive layer as the reflective film 302, these leads exhibit lower resistance than that when these leads are composed of a single layer. Since the reflective conductive films 312, 352, 362, and 372 are formed by patterning the conductive layer 352' which is deposited by high-temperature sputtering, the average grain diameter of the crystal is larger than the average grain size of the crystal in the conductive layer 302' which is deposited by low-temperature sputtering.

Since the reflective conductive films 312, 352, 362, and 372 have lower resistance than that of the reflective film 302, the laminated portions at the segment electrodes 314 and the laminated portions of the leads 350, 360, and 370 have reduced resistances. In particular, the leads 360 from the FPC board 150 to the input bump of the driver IC 122 include power supply lines of the driver IC 122 which supplies the common signal; hence, a relatively high voltage is applied to the leads 360 which are longer than the leads 370. When the leads 360 have high resistance, the effect of voltage drop cannot be ignored. Since the laminated leads 360, however, exhibit low resistance, the effect of the voltage drop is moderated.

Since the segment electrodes 314 and the transparent conductive films 354, 364, and 374 cover the reflective conductive films 312, 352, 362, and 372, respectively, so that these layers are not exposed, corrosion and the like due to moisture penetration is prevented, thus enhancing reliability.

Since the common electrodes 214 provided on the viewer-side substrate 200 are extracted to the backside substrate 300 via the conductive particles 114 and the leads 350, and are further extracted to the region for mounting the driver IC 124 via the leads 360, the connection of the FPC board 150 is achieved on one side regardless of a passive matrix type in this embodiment. Thus, the mounting process is simplified.

In the region for mounting the driver IC 124, the segment electrodes 314 are not provided with the transparent conductive film 312. In the region contained in the sealant 110 and the region for mounting the driver IC 122, the leads 350 are provided with only the transparent conductive films 354 and thus not provided with the reflective conductive films 352. In the region for mounting the driver IC 122 and the region for connecting the FPC board 150, the leads 360 are provided with only the transparent conductive film 364 and thus not provided with the reflective conductive film 362. In the region for mounting the driver IC 124 and the region film connecting the FPC board 150, the leads 370 are provided with only the transparent conductive film 374 and thus not provided with the reflective conductive film 372.

Since the silver alloy exhibits poor adhesiveness to other materials, it is not desirable that this alloy be provided at portions in which stress is applied. If a decrease in resistance of the leads has priority, it is preferable that the reflective conductive film be formed over the entire underlayer of the segment electrode or the transparent conductive film. In such a configuration, however, insufficient connection of the driver IC in the mounting step may cause separation of the reflective conductive film from the substrate due to low adhesiveness, for example, when the driver IC is exchanged due to unsatisfactory connection. Moreover, the conductive particles 114, 134, and 144 are composed of nonconductive particles of plastic or the like of which the surfaces are covered by a metal such as gold (Au). This covering metal exhibits superior adhesiveness to a transparent conductive single layer. Thus, in this embodiment, only the transparent conductive film of ITO or the like is deposited and a reflective conductive film of a silver alloy is not deposited in the region included in the sealant 110, the regions for mounting the driver ICs 122 and 124, and the region for bonding the FPC board 150 to prevent separation of the reflective conductive film.

In the above first embodiment, the reflective film 302 (conductive layer 302') having high reflectance is formed by low temperature sputtering, whereas the reflective conductive films 312, 352, 362, and 372 (conductive layer 352') having low wiring resistance are formed by high-temperature sputtering. Since the deposition of the silver alloy requires both low-temperature sputtering and high-temperature sputtering in the first embodiment, the manufacturing process is complicated. Thus, a second embodiment which can deposit silver alloy films, such as a reflective film and a reflective conductive film, by one step will now be described.

In a liquid crystal device in accordance with the second embodiment, the overall configuration of the liquid crystal panel 100 is similar to that in the first embodiment (FIG. 1), but the internal structures are slightly different from each other. Configurations taken along the X direction and the Y direction are shown in FIGS. 11 and 12, respectively. A difference from the first embodiment shown in FIGS. 2 and 3 is that the protective film 303 is not provided in the sealant frame and the exterior of the sealant frame, and thus is provided only in the interior of the sealant frame so as to cover the reflective films 302.

Thus, the protective film 303 is not provided at the laminated portions in the leads 310, 350, 360, and 370, as shown partial cross-sectional views in FIGS. 13 and 14.

Thus, the reflective conductive films 312, 352, 362, and 372 and the segment electrodes 314, 354, 364, and 374 are provided so as to come into contact with the underlying film 301 at the peripheries thereof. Herein, FIG. 13 is a cross-sectional view illustrating a configuration of the lead portion of the liquid crystal panel in the second embodiment, and corresponds to FIG. 5 in the first embodiment, and FIG. 14 is a partial cross-sectional view illustrating the vicinity of the mounting region for the driver IC in the liquid crystal panel in the second embodiment, and corresponds to FIG. 6 in the first embodiment.

Since other configurations are similar to those in the first embodiment, the description thereof is omitted.

A manufacturing process of the liquid crystal device according to the second embodiment and particularly of the backside substrate will now be described with reference to FIGS. 15 and 16. The description is focused to the segment electrode 314 and the lead 350 in this process, and the sealant and the exterior of the sealant frame are separately described. Since the steps of up to depositing the conductive layer 302' forming the reflective film 302 on the underlying film 301 by low-temperature sputtering in the second embodiment are the same as those in the first embodiment (see FIGS. 8(a) and 8(b)), the subsequent steps will be primarily described.

As shown in FIG. 15(c), the conductive layer 302' deposited by low-temperature sputtering is patterned by a photolithographic process and an etching process to form the openings 309 and the reflective films 302 in the interior of the sealant frame and the reflective conductive films 352 and the reflective conductive films 312, 362, and 372 in the exterior of the sealant frame.

As shown in FIG. 15(d), the protective film 303 of, for example, titanium oxide is formed in the interior of the sealant frame to cover the reflective films 302. This is annealed at a temperature of approximately 400° C. Since crystal grains of a silver alloy constituting the reflective films 302 are pressed by the protective film 303, the crystal grains do not grow, the reflectance of the reflective film 302 being not decreased. In contrast, the crystal grains in the silver alloy constituting the reflective conductive films 312, 352, 362, and 372 grow, the lead resistance thereof decreases although the reflectance thereof decreases.

The subsequent steps are the same as those in FIGS. 9(g), 9(h), and 9(i) in the first embodiment. As shown in FIG. 15(f), the transparent conductive layer 314' of ITO or the like is deposited by a sputtering process or an ion plating process. Next, as shown in FIG. 16(g), the conductive layer 314' is patterned so as to cover the reflective conductive films 312, 352, 362, and 372 in order to form the segment electrodes 314 and the transparent conductive films 354, 364, and 374, respectively. Then, as shown in FIG. 16(h), the alignment film 308 of an organic film such as polyimide is formed in the interior of the sealant frame and the alignment film 308 is subjected to rubbing treatment.

As in the first embodiment, the viewer-side substrate 200 and the backside substrate 300 are bonded to each other, the liquid crystal 160 is enclosed and sealed, and the driver ICs 122 and 124 and the FPC board 150 are mounted. The liquid crystal panel 100 in the second embodiment is thereby formed. The display operation is substantially the same as that in the first embodiment.

In the second embodiment, the reflective conductive films 312, 352, 362, and 372 are formed by patterning the conductive layer 302' of a silver alloy constituting the reflective film 302, and the crystal grains are grown by the subsequent annealing treatment. Thus, these films have lower resistance than that of the reflective film 302. On the other hand, the reflective film 302 is covered by the protective film 303 and the reflectance thereof is not decreased since the crystal grain growth is moderated. According to the second embodiment, the manufacturing process can be simplified since the silver alloy film such as the reflective film and the reflective conductive film can be deposited by one step, in addition to the advantages in the first embodiment, that is, the reflectance of the reflective film 302 is maintained and the lead resistance of the reflective conductive films 312, 352, 362, and 372 is reduced.

Since the reflective film 302 containing silver is covered by the protective film 303 in the first and second embodiment, the reflective film 302 is electrically floating. Thus, the display quality may be impaired by capacitive coupling between adjoining segment electrodes 314 via the reflective film 302.

Thus, the protective film 303 has a large thickness so that the distance between the reflective film 302 and the segment electrodes 314 is approximately 2 μm to prevent capacitive coupling between the segment electrodes 314. If the thick protective film 303 is not uniform in such a configuration, the display quality may be impaired due to a disordered cell gap.

Thus, as shown in FIG. 17, it is preferable that the reflective film 302 and the segment electrode 314 have substantially the same width so as to overlap in plan view. When the protective film 303 is thin to some extent in such a configuration, a segment electrode 314 is capacitively coupled with the reflective film 302 beneath the same, but the adjoining segment electrode 314 is not coupled with the reflective film 302, thus preventing deterioration of display quality. In such configuration, each segment electrode 314 and the corresponding reflective film 302 beneath the same may be physically connected to each other by providing a connection point.

In the above-described first and second embodiments, the color filters 204 are provided on the viewer-side substrate 200. However, the present invention is not limited this configuration, and these may be provided on the backside substrate 300.

However, the color filters must be on the reflective film 302 which is previously formed. When an acrylic resin containing a coloring agent is used as color filters, it should be noted that the reflectance may decrease due to crystal grain growth in the silver alloy constituting the reflective film 302 during a high-temperature treatment which is performed to dry and cure the resin.

A third embodiment in which color filters are provided on the backside substrate 300 will be described, keeping this point in mind.

The overall configuration of the liquid crystal panel 100 in the liquid crystal device according to the third embodiment is substantially the same as that in the first embodiment (see FIG. 1), but the internal structure thereof is different. FIGS. 18 and 19 are partial cross-sectional views illustrating configurations of the liquid crystal panel taken along the X direction and the Y direction, respectively.

As shown in these drawings, color filters 305 are not provided on the viewer-side substrate 200 but on the backside substrate 300. Thus, the shading film 202 and the planarization film 205 (see FIGS. 2 and 3) are not provided on the viewer-side substrate 200, and a transparent conductive film constituting the common electrode 214 is directly provided on the viewer-side substrate 200. The alignment film 208 will be provided on the inner face of the viewer-side substrate 200 or on the common electrode 214.

Red (R), green (G), and blue (B) color filters 305 having a stripe arrangement (see FIG. 4) are provided at positions corresponding to crossings of the common electrodes 214 and the segment electrodes 314 on the protective film 303 on the backside substrate 300.

In order to planarize steps due to these color filters 305, a planarization film 307 of an insulating material is provided, and a plurality of strip segment electrodes 314 of a transparent conductive material such as ITO extends in the Y direction. An alignment film 308 of polyimide or the like is formed on the segment electrodes 314 and the planarization film 307 and is subjected to rubbing treatment in a predetermined direction before bonding with the viewer-side substrate 200.

In this embodiment, the reflective film 302 is electrically floating in the interior of the frame of the sealant 110. Thus, the protective film 303, the color filters 305, and the planarization film 307 are formed so that the distance between the reflective film 302 and the segment electrodes 314 is approximately 2 μm. As a result, each segment electrode 314 is not capacitively coupled with the reflective film 302.

The protective film 303 in this embodiment functions as a film which protects the reflective film 302, a film which prevents a decrease in reflectance of the reflective film 302 during a high-temperature treatment for forming the color filters 305, and a film which reflects large amounts of blue light components in the light incident from the viewer-side substrate 200.

Since the alignment film 308, the underlying planarization film 307, and the protective film 303 are unnecessary in regions other than the display region in this embodiment, these are not provided in the vicinity and the exterior of the region of the sealant 110. Thus, the segment electrodes 314 are, as shown in FIG. 19, formed on the underlying film 301 in the vicinity of the region of the sealant 110.

Since the leads 310, 350, 360, and 370 in this embodiment are the same as those in the second embodiment, the cross-sectional configurations and the configuration at the periphery of the driver IC thereof are the same as those in FIGS. 13 and 14.

A manufacturing process of the liquid crystal device according to the third embodiment and particularly of the backside substrate will be described with reference to FIGS. 20 and 21. The description is focused to the segment electrode 314 and the lead 350 in this process, and the interior of the sealant frame (display region), the sealant, and the exterior of the sealant frame are separately described. Since the steps of up to depositing the conductive layer 302' forming the reflective film 302 on the underlying film 301 by low-temperature sputtering in the third embodiment are the same as those in the first and second embodiments (see FIGS. 8(a), 8(b), 15(a), and 15(b), the subsequent steps will be primarily described.

As shown in FIG. 20(c), the conductive layer 302' deposited by low-temperature sputtering is patterned by a photolithographic process and an etching process to form the openings 309 and the reflective films 302 in the interior of the sealant frame and the reflective conductive films 352 and the reflective conductive films 312, 362, and 372 in the exterior of the sealant frame.

As shown in FIG. 20(d), the protective film 303 of, for example, titanium oxide is formed in the interior of the sealant frame to cover the reflective films 302. Then, as shown in FIG. 20(e), red (R), green (G), and blue (B) color filters 305 having a predetermined array are formed on the protective film 303 using photolithographic, printing, and transferring technologies. Each color filter 305 is composed of an acrylic resin containing one of the red, green, and blue coloring agents. The resin applied on the protective film 303 is dried and cured by a high-temperature treatment. Since the crystal grain growth in the silver alloy constituting the reflective film 302 is suppressed by the protective film 303, the reflectance of the reflective film 302 is not decreased. Meanwhile, the lead resistance of the reflective conductive films 312, 352, 362, and 372 decreases due to crystal grain growth during the high-temperature treatment.

Incidentally, though not shown in the present embodiment, a shading film made of chromium or the like may be provided between the color filters in order to prevent a decrease of color contrast due to the mixture of colors between the adjacent sub-pixels.

Subsequently, as shown in FIG. 21(f), the planarization (overcoat) film 307 is formed by acrylic resin or epoxy resin for protecting and planarizing the color filters 305. After this formation, as shown in FIG. 21(g), the transparent conductive layer 314' made of ITO or the like is deposited by sputtering or the like on the planarized surface of the planarization film 307.

As shown in FIG. 21(h), the transparent conductive layer 314' is patterned using a photolithographic process and an etching process to form the segment electrodes 314 in the interior of the sealant frame and the transparent conductive films 354, 364, and 374 in the exterior of the sealant frame. The peripheries of the segment electrodes 314 and the transparent conductive films 354, 364, and 374 are not removed so as to come into contact with the underlying film 301 such that the reflective conductive films 312, 352, 362, and 372, respectively, are not exposed.

Since the surfaces of the reflective conductive films 312, 352, 362, and 372 are thereby not exposed after the conductive layer 314' is deposited, these layers are prevented from corrosion and separation.

As shown in FIG. 20(i), the alignment film 308 of an organic film such as polyimide is formed and the alignment film 308 is subjected to rubbing treatment. In the subsequent steps, the viewer-side substrate 200 and the backside substrate 300 are bonded to each other, the liquid crystal 160 is enclosed and sealed, the driver ICs 122 and 124 and the FPC board 150 are mounted, as in the first and second embodiment to complete the liquid crystal panel 100 in the third embodiment. The display operation is the same as that in the first embodiment.

In the third embodiment, the reflective conductive films 312, 352, 362, and 372 are formed by patterning the conductive film 302' of a silver alloy constituting the reflective film 302, and the crystal grains are grown by a high-temperature treatment for the color filters 305 and the alignment film 308. Thus, the resistance of these layers is lower than that of the reflective film 302. Since the reflective film 302 is covered by the reflective film 303, the crystal grain growth is suppressed, and the reflectance does not decrease. Accordingly, the third embodiment can achieve both high reflectance of the reflective film 302 and low lead resistance of the reflective conductive films 312, 352, 362, and 372.

The reflective film 302 containing silver covered by the protective film 303 is electrically floating in the third embodiment. Thus, the display quality may be impaired by capacitive coupling between adjoining segment electrodes 314 via the reflective film 302. Thus, the protective film 303, the color filters 305, and the planarization film 307 are formed so that the distance between the reflective film 302 and the segment electrodes 314 is approximately 2 μm to prevent capacitive coupling between the segment electrode 314. However, the color filters readily form steps in such a configuration. If the surface of the planarization film 307 is not planarized, the display quality may be impaired due to a disordered cell gap.

Thus, it is preferable, as shown in FIG. 22, that the reflective films 302 and the segment electrodes 314 have the same width and lie at the same positions in plan view. If the distance between the reflective films 302 and the segment electrodes 314 is small in this configuration, a segment electrode 314 is capacitively coupled with the underlying reflective film 302, but is not capacitively coupled with the adjoining segment electrode 314, maintaining high display quality. In such configuration, each segment electrode 314 and the corresponding reflective film 302 beneath the same may be physically connected to each other by providing a connection point CP.

In the above first and second embodiments, the protective film 303 is provided on the reflective film 302 to reflect large amounts of blue light components in view of attenuative reflection of the blue light component by the reflective film 302. However, the present invention is not limited to this configuration. That is, a layer or film other than the protective film 303 having a function which enhances the blue light component attenuated by the reflective film 302 compared to the red and green components may be provided.

A fourth embodiment according to a color filter having such a function will be described.

The protective film 303 in the fourth embodiment does not function as a film which reflects large amounts of blue light components as in the first, second, and third embodiments, and functions as merely the protective film for the reflective film 302 (and suppression of crystal grain growth at high temperature treatment). Thus, the protective film 303 in the fourth embodiment may be composed of a transparent material such as $SiO_2$ and SiN.

The color filter in the fourth embodiment may be provided on the viewer-side substrate 200 as in the first and second embodiments, or on the backside substrate 300 as in the third embodiment. In brief, the red (R), green (G), and blue (B) colors are set so that the device has the following characteristics.

FIG. 24 is a graph illustrating transmittance-vs.-wavelength characteristics of R, G, and B light components of the color filter according to this embodiment. In this graph, the maximum transmittance of the transmitted light is normalized to 100%.

FIG. 25 is an xy chromaticity diagram represented by a CIE1931 standard color system of the R, G, and B light beams which pass through the color filter in this embodiment, wherein CIE represents Commission Internationale de l'Exlairage.

As shown in this graph, the coordinate B of the light which passes through the blue color filter lies at the exterior of the W. (white: X=0.300 and y=0.301) relative to the coordinate R of the light which passes through the red color filter; hence, the color saturation of B is higher than those of G and R.

In this embodiment, the transmittance characteristics of the color filters are set such that the distance L1 from the coordinate B to the coordinate W is longer than the distance L2 from the coordinate G to the coordinate W and the distance L3 from the coordinate R to the coordinate W. The color set at the coordinate B belongs to, as shown in FIG. 26, the blue green (BG) and blue (B) regions in the xy chromaticity diagram.

Thus, in this embodiment, the blue light components are enhanced in the light which passes through the color filters. The light containing the enhanced blue light components is reflected by the reflective film 302, which attenuates the blue light components, and is emitted to the viewer. Thus, the light reflected towards the viewer is white as a result of balance in the intensity and amount between red, green, and blue.

In the above embodiments, the common electrodes 214 are driven by the driver IC 122 and the segment electrodes 314 are driven by the driver IC 124 (see FIG. 1). The present invention, however, is not limited to this configuration. For example, the present invention is applicable to a one-chip type including both ICs, as shown in FIG. 27.

The liquid crystal device shown in this drawing has a plurality of common electrodes 214 extending in the X direction on the viewer-side substrate 200 as in the other embodiments, but differs from these embodiments in that the upper half common electrodes 214 and the lower half common electrodes 214 are extracted from the left and the right, respectively, via the leads 350 and are connected to a driver IC 126.

The driver IC 126 is a one-chip IC including the driver IC 122 and the driver IC 124 in the above embodiments, and is connected to the segment electrodes 314 in the exterior of the frame of the sealant 110. Although each lead 310 is a laminate of the reflective conductive film 312 and the segment electrode 314 in the exterior of the sealant frame, the driver IC 126 is connected to the segment electrodes 314 in the region of the connection with the driver IC chip 126 since the reflective conductive film 312 is not deposited in this region.

The FPC board 150 supplies signals for controlling the driver IC 126 from an external circuit (not shown in the drawing) via the leads 360 (370). In the liquid crystal device shown in FIG. 27, the common electrodes 214 may be extracted from one side if the number of the common electrodes 214 is small.

As shown in FIG. 28, the present invention is also applicable to a type in which the driver IC 126 is not mounted on the liquid crystal panel 100. In the liquid crystal device shown in this drawing, the driver IC 126 is mounted on the FPC board 150 by, for example, a flip chip technology. Alternatively, the driver IC 126 may be bonded to inner leads by a tape automated bonding (TAB) technology and may be bonded to the liquid crystal panel 100 with outer leads. In such a configuration, however, the number of the connections to the FPC board 150 increases as the pixels increase.

In the above embodiments, transflective liquid crystal devices are described. However, the present invention is also applicable to a reflective liquid crystal device not having openings 309. In the reflective type, a front light which emits light from the viewer side may be provided instead of the backlight, if necessary.

In the transflective type, the reflective film 302 is not necessarily provided with the openings 309, as long as the light incident from the backside substrate 300 is partially visible by the viewer through the liquid crystal 160. For example, when the thickness of the reflective film 302 is extremely small, the device can function as a transflective pattern even if the openings 309 are not provided.

In the above embodiments, connection between the common electrodes 214 and the leads 350 is achieved with conductive particles 114 contained in the sealant 110. However, the connection may be achieved in another region provided at the exterior of the frame of the sealant 110.

Since the common electrodes 214 and the segment electrodes 314 are complementary to each other, the segment electrodes and the common electrodes may be provided on the viewer-side substrate 200 and the backside substrate 300, respectively.

The liquid crystal is driven without using switching elements in the above embodiments, but may be driven by thin film diodes (TFDs) or thin film transistors (TFTs) provided in the sub-pixels.

Although the above embodiments describe liquid crystal devices which perform color displaying, the present invention is also applicable to liquid crystal devices which perform monochromatic displaying.

Although a TN liquid crystal is used in the above embodiments, the liquid crystal device may be a bistable type having a memory effect such as a bistable twisted nematic (BTN) type and a ferroelectric type, a polymer dispersion type, or a guest-host type in which a dye (guest) having different visible light absorbencies between the long axis and the short axis of molecules is dissolved in a liquid crystal (host) having a predetermined molecular arrangement so that the dye molecules and the liquid crystal molecules are arranged in parallel.

Moreover, the configuration may be a vertical (homeotropic) alignment in which the liquid crystal molecules are arranged perpendicular to the both substrates when no voltage is applied and parallel to the both substrates when a voltage is applied, or may be a parallel (homogeneous) alignment in which the liquid crystal molecules are arranged parallel to the both substrates when no voltage is applied and perpendicular to the both substrates when a voltage is applied. Accordingly, the present invention can be applied to various types of liquid crystals and alignment systems.

Several electronic apparatuses using the above liquid crystal display device will now be described.

An example in which the liquid crystal display device according to one of the above embodiments is applied to a mobile personal computer will now be described.

FIG. 29 is an isometric view illustrating the configuration of this personal computer. In the drawing, the personal computer 1100 is provided with a body 1104 including a keyboard 1102 and a liquid crystal display unit. The liquid crystal display unit 1106 is provided with a back light (not shown in the drawing) at the back face of the above-described liquid crystal panel 100. The display is thereby visible as a reflective type when external light is sufficient or a transmissive type when external light is insufficient.

Next, an example in which the liquid crystal device is applied to a display section of a portable phone will now be described. FIG. 30 is an isometric view illustrating the configuration of the portable phone. In the drawing, the portable phone 1200 is provided with a plurality of operation keys 1202, an earpiece 1204, a mouthpiece 1206, and the above-mentioned liquid crystal panel 100. This liquid crystal panel 100 may be provided with a backlight (not shown in the drawing) at the back face thereof for improving the visibility.

Next, a digital still camera using the liquid crystal device as a finder will be described. FIG. 31 is an isometric view illustrating the configuration of the digital still camera and the connection to external devices in brief.

Typical cameras sensitize films based on optical images from objects, whereas the digital still camera 1300 generates imaging signals from the optical image of an object by photoelectric conversion using, for example, a charge coupled device (CCD). The digital still camera 1300 is provided with the liquid crystal panel 100 at the back face of a case 1302 to perform display based on the imaging signals from the CCD. Thus, the liquid crystal panel 100 functions as a liquid crystal finder for displaying the object. A photo acceptance unit 1304 including optical lenses and the CCD is provided at the front side (behind in the drawing) of the case 1302.

When a cameraman determines the object image displayed in the liquid crystal panel 100 and releases the shutter, the image signals from the CCD are transmitted and stored to memories in a circuit board 1308. In the digital still camera 1300, video signal output terminals 1312 and input/output terminals 1314 for data communication are provided on a side of the case 1302. As shown in the drawing, a television monitor 1430 and a personal computer 1440 are connected to the video signal terminals 1312 and the input/output terminals 1314, respectively, if necessary. The imaging signals stored in the memories of the circuit board 1308 are output to the television monitor 1430 and the personal computer 1440, by a given operation.

Examples of electronic apparatuses, other than the personal computer shown in FIG. 29, the portable phone shown in FIG. 30, and the digital still camera shown in FIG. 31, include liquid crystal television sets, view-finder-type and monitoring-type video tape recorders, car navigation systems, pagers, electronic notebooks, portable calculators, word processors, workstations, TV telephones, point-of-sales system (POS) terminals, and devices provided with touch panels. Of course, the above liquid crystal device can be applied to display sections of these electronic apparatuses.

As described above, according to the present invention, when the silver alloy is used as the reflective film in the reflective or transflective liquid crystal device, a decrease in reflectance of the reflective film during the subsequent high-temperature treatment is prevented and the resistance of the leads can be maintained at low levels.

What is claimed is:

1. A liquid crystal device including a first substrate and a second substrate opposing each other and a liquid crystal enclosed in a gap between the first substrate and the second substrate, the liquid crystal device comprising:

a reflective film which is provided on the first substrate and contains silver;

a protective film provided on the reflective film;

a first transparent electrode provided on the protective film;

an alignment film provided on the first transparent electrode; and a first lead provided on the first substrate.

wherein the first lead has a metal film, the reflective film and the metal film are composed of elemental silver or primarily composed of silver and the reflectance of the reflective film is higher than that of the metal film.

2. A liquid crystal device including a first substrate and a second substrate opposing each other and a liquid crystal enclosed in a gap between the first substrate and the second substrate, the liquid crystal device comprising:

a reflective film which is provided on the first substrate and contains silver;

a protective film provided on the reflective film;

a first transparent electrode provided on the protective film;

an alignment film provided on the first transparent electrode; and a first lead provided on the first substrate, wherein the first lead has a metal film, the reflective film and the metal film are composed of elemental silver or primarily composed of silver, and the lead resistance of the metal film is lower than that of the reflective film.

3. A method for making a liquid crystal device including a first substrate and a second substrate opposing each other and a liquid crystal enclosed in a gap between the first substrate and the second substrate, the method comprising the steps of:

providing a reflective film on the first substrate, the reflective film composed of elemental silver or primarily composed of silver;

providing a protective film on the reflective film;

providing a metal film on the first substrate, the metal film composed of elemental silver or primarily composed of silver, and the metal film constituting a lead;

providing a transparent electrode on the protective film; and providing an alignment film on the first transparent electrode, wherein the reflectance of the reflective film is higher than that of the metal film.

4. A method for making a liquid crystal device including a first substrate and a second substrate opposing each other and a liquid crystal enclosed in a gap between the first substrate and the second substrate, the method comprising the steps of:

providing a reflective film on the first substrate, the reflective film composed of elemental silver or primarily composed of silver;

providing a protective film on the reflective film;

providing a metal film on the first substrate, the metal film composed of elemental silver or primarily composed of silver, and the metal film constituting a lead;

providing a transparent electrode on the protective film; and providing an alignment film on the first transparent electrode, wherein the lead resistance of the metal film is lower than that of the reflective film.

5. A method for making a liquid crystal device including a first substrate and a second substrate opposing each other and a liquid crystal enclosed in a gap between the first substrate and the second substrate, the method comprising the steps of:

providing a reflective film and a metal film on the first substrate, the reflective film and the metal film composed of elemental silver or primarily composed of silver, and the metal film constituting a lead;

providing a protective film on the reflective film;

providing a transparent electrode on the protective film; and providing an alignment film on the first transparent electrode, wherein the reflectance of the reflective film is higher than that of the metal film.

6. A method for making a liquid crystal device including a first substrate and a second substrate opposing each other and a liquid crystal enclosed in a gap between the first substrate and the second, the method comprising the steps of:

provide a reflective film and a metal film on the first substrate, the reflective film and the metal film composed of elemental silver or primarily composed of silver, and the metal film constituting a lead;

providing a protective film on the reflective film;

providing a transparent electrode on the protective film; and providing an alignment film on the first transparent electrode, wherein the lead resistance of the metal film is lower than that of the reflective film.

* * * * *